US012403618B2

(12) United States Patent
Geiser et al.

(10) Patent No.: US 12,403,618 B2
(45) Date of Patent: *Sep. 2, 2025

(54) ARRANGEMENT FOR PROTECTING AGAINST UNAUTHORIZED INTERVENTION IN A CONTAINMENT USING A WORK GLOVE

(71) Applicant: Skan AG, Allschwil (CH)

(72) Inventors: Christoph Joschi Geiser, Möhlin (CH); Frank Martin Lehmann, Binningen (CH)

(73) Assignee: Skan AG, Allschwil (CH)

( * ) Notice: Subject to any disclaimer, the term of this patent is extended or adjusted under 35 U.S.C. 154(b) by 439 days.

This patent is subject to a terminal disclaimer.

(21) Appl. No.: 17/631,370

(22) PCT Filed: Jul. 23, 2020

(86) PCT No.: PCT/CH2020/000008
§ 371 (c)(1),
(2) Date: Jan. 28, 2022

(87) PCT Pub. No.: WO2021/016725
PCT Pub. Date: Feb. 4, 2021

(65) Prior Publication Data
US 2022/0324123 A1  Oct. 13, 2022

(30) Foreign Application Priority Data
Jul. 30, 2019  (EP) .................................... 19405011

(51) Int. Cl.
*B25J 21/02*  (2006.01)
*B01L 1/04*  (2006.01)

(52) U.S. Cl.
CPC .................. *B25J 21/02* (2013.01); *B01L 1/04* (2013.01); *B01L 2200/141* (2013.01)

(58) Field of Classification Search
CPC ........ B01L 2200/141; B01L 1/04; B25J 21/02
See application file for complete search history.

(56) References Cited

U.S. PATENT DOCUMENTS 2,695,605 A * 11/1954 Gibbon ................ A61G 11/009
251/9
4,373,547 A   2/1983 Geis et al.
(Continued)

FOREIGN PATENT DOCUMENTS

CH       707655 A1   8/2014
CH       709889 A2   1/2016
(Continued)

OTHER PUBLICATIONS

International Search Report of the International Searching Authority, along with an English translation, mailed on Oct. 5, 2020, issued in connection with International Application No. PCT/CH20/000008 (6 pages).
(Continued)

*Primary Examiner* — Matthew W Ing
(74) *Attorney, Agent, or Firm* — McCarter & English, LLP

(57) ABSTRACT

A work glove is installed at the port flange, with the result that the operator can enter the working chamber of the containment in a protected manner. A multiplicity of port flanges are usually mounted on the containment and a work glove is fastened in each case to the respective port flange. Machinery for processing material to be treated is often set up in the working chamber. In order to temporarily block the access, a shut-off part which can be moved into a blocking position and an open position is provided. In order to record personal data relating to the operator, the arrangement has a capture unit which has a connection to a microcontroller.

28 Claims, 17 Drawing Sheets

(56) References Cited

U.S. PATENT DOCUMENTS

Figure 1:
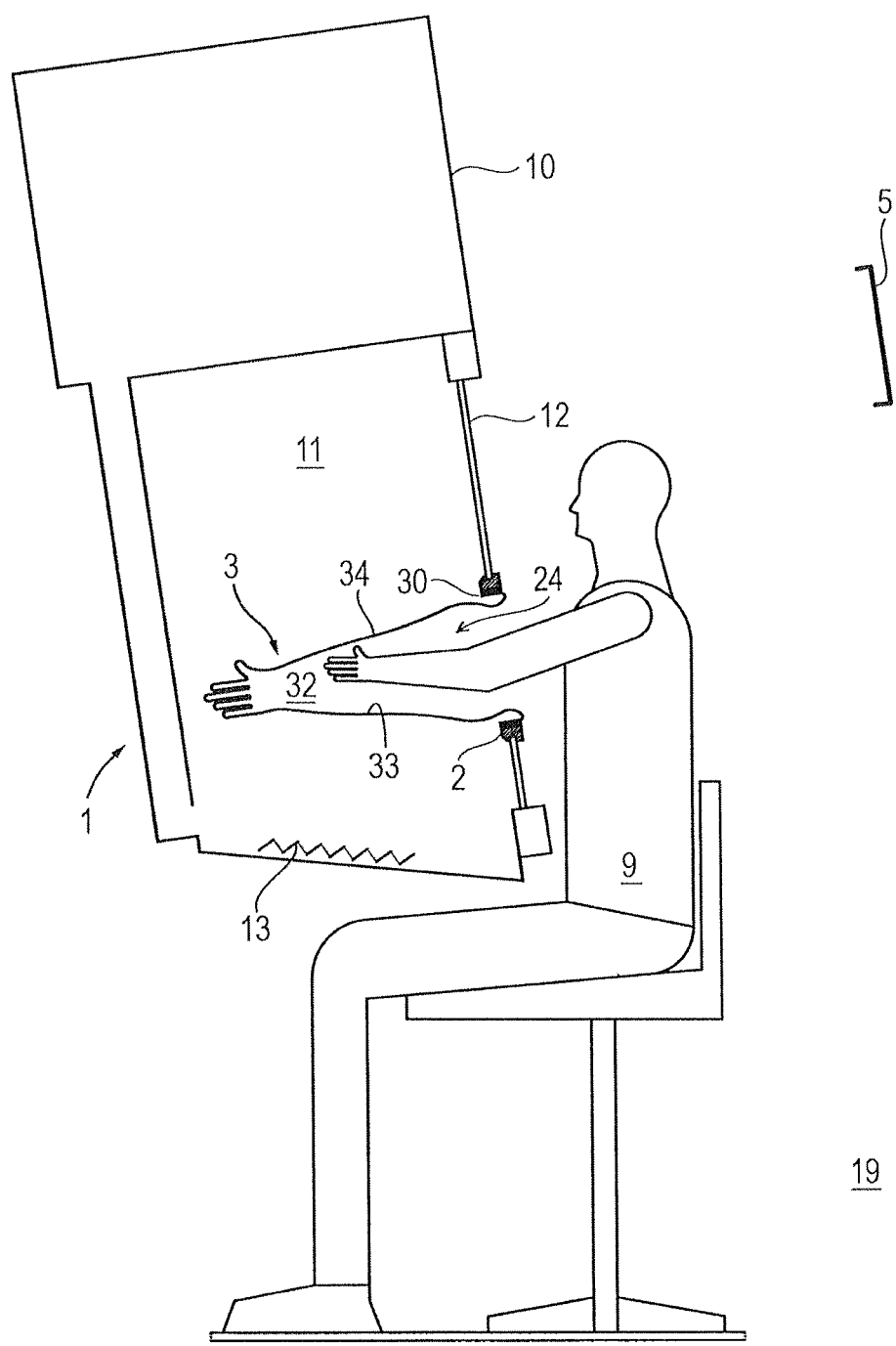

| | | | |
|---|---|---|---|
| 5,861,305 | A | 1/1999 | Silley et al. |
| 9,589,689 | B2 | 3/2017 | Fournier |
| 10,617,045 | B1 | 4/2020 | Judy |
| 2005/0269916 | A1 | 12/2005 | Oyama et al. |
| 2012/0267367 | A1 | 10/2012 | Armau et al. |
| 2015/0243392 | A1 | 8/2015 | Fournier |
| 2020/0171681 | A1* | 6/2020 | Copley .................. B25J 21/02 |
| 2022/0279877 | A1* | 9/2022 | Geiser .................... B25J 19/06 |
| 2022/0324123 | A1* | 10/2022 | Geiser .................... B25J 19/06 |

FOREIGN PATENT DOCUMENTS

| | | |
|---|---|---|
| DE | 3616893 C1 | 9/1987 |
| FR | 1147608 A | 11/1957 |
| JP | H01223397 A | 9/1989 |
| JP | H0270009 A | 3/1990 |
| JP | H094897 A | 1/1997 |
| WO | 2018/108956 A1 | 6/2018 |

OTHER PUBLICATIONS

Written Opinion of the International Searching Authority, mailed on Oct. 5, 2020, issued in connection with International Application No. PCT/CH20/000008 (7 pages).

International Search Report of the International Searching Authority, along with an English translation, mailed on Oct. 5, 2020, issued in connection with International Application No. PCT/CH20/000009 (7 pages).

Written Opinion of the International Searching Authority, mailed on Oct. 5, 2020, issued in connection with International Application No. PCT/CH20/000009 (7 pages).

Jugitec Save Glovebox Gloves by Jung Gummitechnik GmbH, https://jugitec.de, Jul. 25, 2019 (4 pages).

Office Action dated Jul. 5, 2024, issued in connection with U.S. Appl. No. 17/631,351 (14 pages).

Office Action dated Feb. 6, 2025, issued in connection with U.S. Appl. No. 17/631,351 (12 pages).

Applicant-Initiated Interview Summary dated May 2, 2025, issued in connection with U.S. Appl. No. 17/631,351 (2 pages).

Notice of Allowance dated Jun. 4, 2025, issued in connection with U.S. Appl. No. 17/631,351 (6 pages).

\* cited by examiner

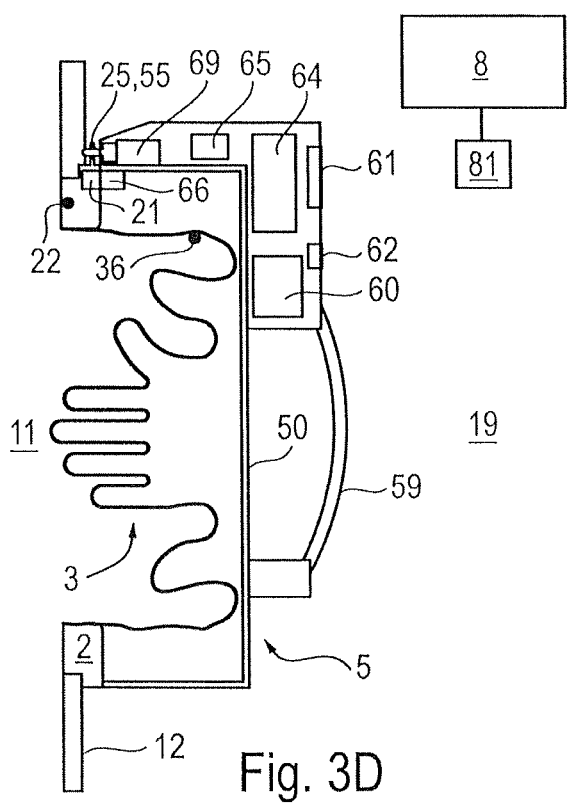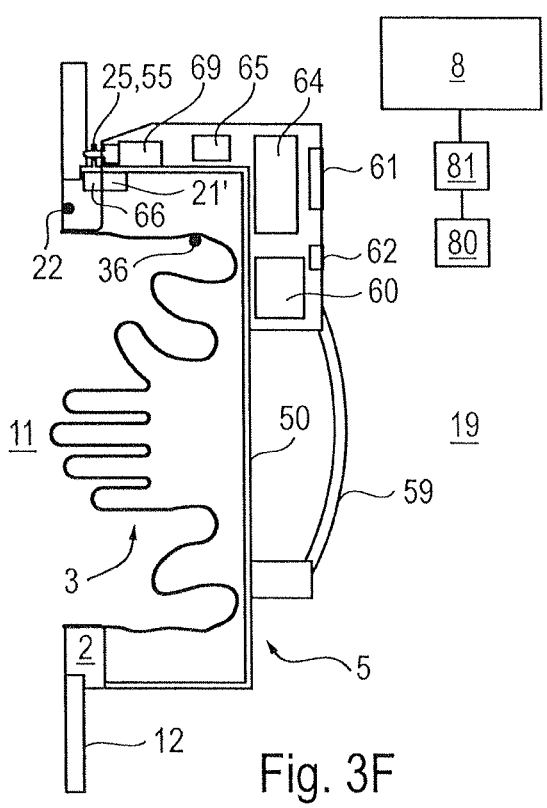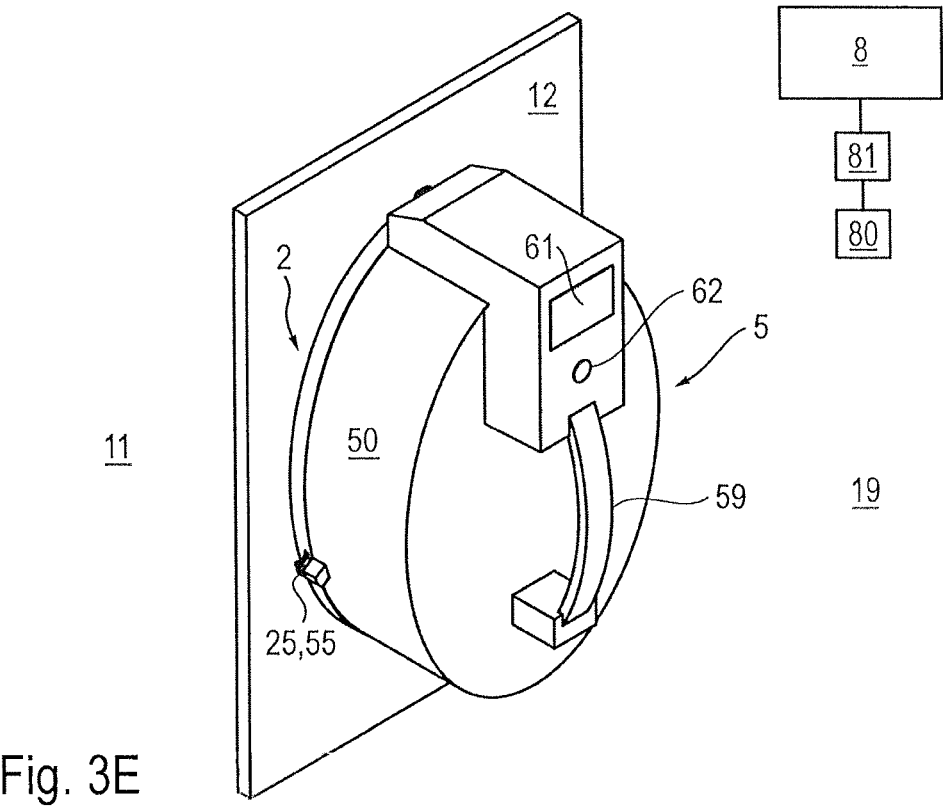

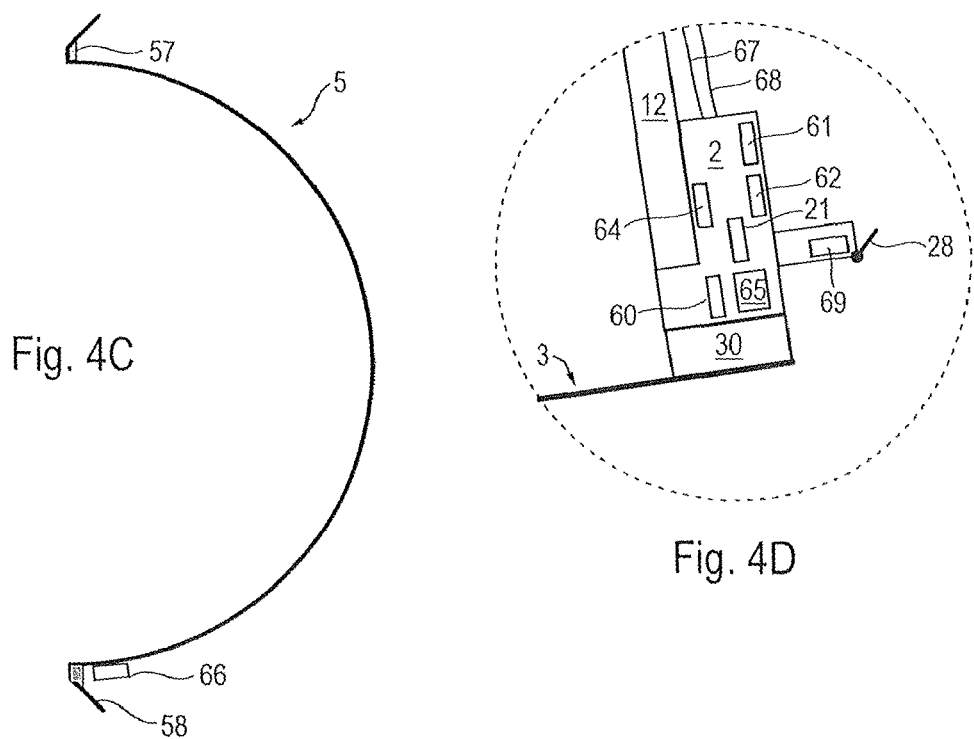
Fig. 4C
Fig. 4D
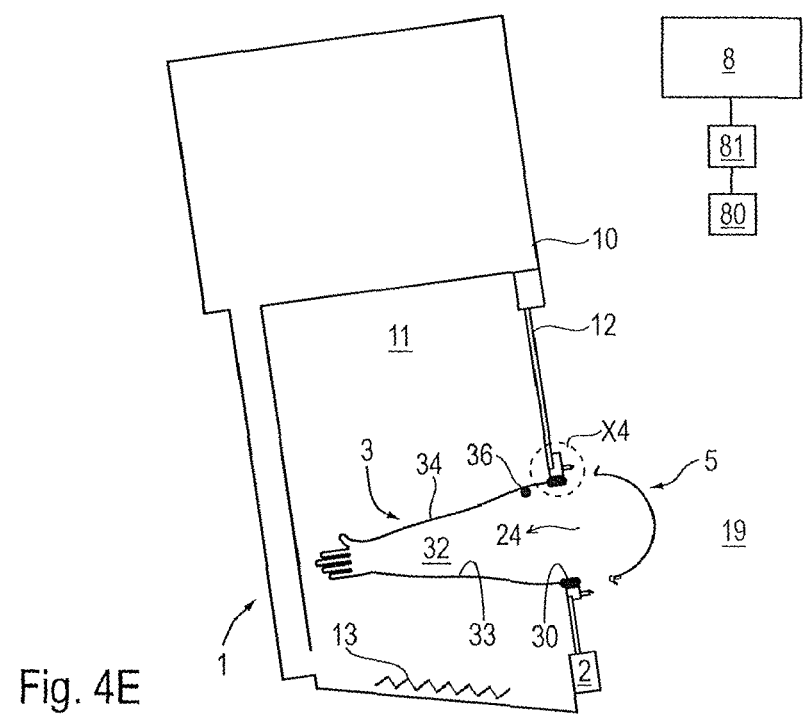
Fig. 4E

ARRANGEMENT FOR PROTECTING AGAINST UNAUTHORIZED INTERVENTION IN A CONTAINMENT USING A WORK GLOVE

RELATED APPLICATIONS

This application is a U.S. National Phase Application under 35 U.S.C. 371 of International Application No. PCT/CH2020/000008 filed Jul. 23, 2020, which claims the benefit of European Patent Application No. 19405011.8 filed on Jul. 30, 2019. The disclosures of these applications are incorporated herein by reference in their entireties.

FIELD OF THE INVENTION

The present invention relates to an arrangement for protecting against unauthorized intervention in a containment using a work glove through an access present in a port flange. The port flange is installed in the front window or the wall of a containment positioned in an installation space. The work glove is installed on the port flange, by means of which the operator can intervene in the work chamber of the containment under protective conditions. A containment usually has multiple port flanges, to each of which there is fastened a work glove. The work chamber usually contains equipment for processing material to be treated, for example pharmaceuticals or biotechnical substances. To prevent inadmissible intervention in the work chamber of the containment using the work glove through the access present in the port flange, a shut-off part is provided to temporarily block the access, which shut-off part can move into a blocking position and an open position.

PRIOR ART

The company Franz Ziel GmbH, D-48727 Billerbeck/Germany, at its first Pharmaceutical Symposium in February 2019, presented a shut-off device for protecting against unauthorized intervention in work gloves installed on insulators (see https://www.ziel-gmbh.com/de/newsarea/news-details/erstes-pharma-symposium-bei-der-franz-ziel-gmbh.html; Internet extract from 18 Jul. 2019). This shut-off device consists of a cover which is cross-shaped in principle, which is fitted from the outside onto the access of the port flange and can be locked by means of a closing mechanism so that only the operator who has the matching key can remove the cover and thus gain access.

A further shut-off device of this kind has been offered by the consolidated companies OPTIMA pharma GmbH, D-74523 Schwäbisch Hall/Germany together with MET-ALL+PLASTIC GmbH, D-78315 Radolfzell/Germany, at the Achema Forum, June 2018, Frankfurt am Main/Germany (see https://www.optima-packaging.com/en/press-area/press-kit-2016/press-release-optima-pharma-and-metall-plastic-achema-2018; Internet excerpt from 18 Jul. 2019). In the case of this shut-off device, a planar cover blocks any intervention, wherein in the case of adjacent port flanges the covers are additionally connected by means of a crossbar. Safety sensors signal the opening of the covers. If a safety interlock is fitted, opening is only permitted following authorization. The shut-off device from ROBERT BOSCH GmbH, D-70442 Stuttgart/Germany, which is published in Achema-Trendbericht Pharmaverpackungen (see https://www.pharma-food.de/achema-trendbericht-pharmaverpackungen/3/; Internet excerpt from 18 Jul. 2019) functions similarly.

Lastly, I.M.A. Industria Macchine Automatiche S.p.A. IT-40064, Ozzano dell'Emilia (Bo)/Italy, has offered a shut-off device on an insulator for the purpose discussed here (see https://ima.it/pharma/machine/barrier-technology-open-closed-rabs/; Internet excerpt of 18 Jul. 2019). The intervention in the port flange and thus in the work glove fastened here is blocked by a lockable cover, which is equipped with a safety sensor and a safety interlock and can pivot to the side, into the release position, only once authorization has been granted.

OBJECT OF THE INVENTION

Proceeding from the prior art already known, the problem addressed by the invention is that of creating a further developed arrangement for protecting against unauthorized intervention in the work chamber of a containment using a work glove through an access provided in a port flange. It is assumed here that the containment usually has multiple port flanges which are all provided with a work glove, and that the work chamber often contains equipment for processing material to be treated. The intention here is to prevent unauthorized interventions by operators, in the form of "uncontrolled human interventions" and thus in particular to make the production of pharmaceuticals loss-free and safer and to ensure a comprehensive logging of all actions performed at the port flange. An additional problem lies in designing a work glove so that this itself provides a shut-off part for protection against unauthorized access or can be used in combination with a separate shut-off part.

OVERVIEW OF THE INVENTION

In the arrangement designed for protecting against unauthorized intervention in a containment using a work glove through an access present in a port flange, the port flange is usually installed in a front window or in a wall of a housing of the containment positioned in an installation space. As is usual, the work glove is installed on the port flange and allows an operator to enter the work chamber of the containment in a protected manner. In the event that multiple port flanges are installed on the containment, there is one work glove fastened to each port flange. Equipment for processing a material to be treated is often provided in the work chamber. To temporarily block access, a shut-off part is provided, which can move into a blocking position and an open position. To record personal data of the operator, the arrangement has a capture unit, which has a connection to a microcontroller, in order to issue a switching command to an activator if there is correspondence between the captured personal data and the data in the microcontroller, whereby the shut-off part can be brought into the blocking position or can be moved therefrom into the open position and therefore the access is blocked or accessible, respectively. The activator is arranged on the port flange or on the shut-off part. The data of the microcontroller are stored directly therein or originate from an external control unit.

Specific embodiments of the invention will be defined hereinafter: The capture unit for recording personal data of the operator is assigned to the corresponding port flange or the corresponding shut-off part. If there is correspondence between the captured personal data and the data in the microcontroller, the activator receives the switching command in order to allow the operator to fit this specific shut-off part to this specific port flange and to bring it into the blocking position or to unlock it and to remove it from this specific port flange, whereby the access is blocked or accessible.

In a particularly advantageous embodiment, the capture unit for recording personal data of the operator is contained directly in the corresponding port flange or in the corresponding shut-off part. Alternatively, the capture unit can be designed for all relevant port flanges and shut-off parts of the containment in a mobile device, for example a tablet computer.

The capture unit is intended for recording biometric identifiers of the operator, a code to be input by the operator, or the electronic data of a data carrier to be presented by the operator. Here, depending on the identifier recorded by the capture unit from the operator, the authorization to move the shut-off part into the blocking or open position at the relevant port flange is granted, or otherwise denied in cooperation with the microcontroller, the relevant operator by switching the activator, depending on the data stored in the microcontroller or data received via the control unit.

The shut-off part is:
integrated directly in the port flange and can be formed in a pivotable, stretchable, shutter-like or expandable manner; or
formed as a separate closure body that can be docked on or removed from the port flange; or
a releasable part of a glove, added to form a glove insert.

The shut-off part can be formed in the configuration as a closure body integrated in the port flange, wherein the port flange and shut-off part are each provided with a safety sensor. Here, the two pairs of safety sensors are used, in cooperation with an external safety relay, to capture the position of the shut-off part in the port flange and, when the shut-off part is open, to activate an automatic blocking of the equipment.

Alternatively, the shut-off part can be designed in the configuration as a separate closure body which can be docked on or removed from the port flange. The port flange and shut-off part are also each in turn provided with a safety sensor. The two safety sensors are now used, in cooperation with an external safety relay, to capture the position of the shut-off part in relation to the port flange and, when the shut-off part is distanced from the port flange, to activate an automatic blocking of the equipment.

In a further alternative, the shut-off part can be formed in the configuration as a closure body which is releasably connected to the glove insert and which can be locked on or removed from the port flange. The shut-off part and port flange are each again equipped with a safety sensor. The two pairs of safety sensors are again intended, in cooperation with an external safety relay, to capture the position of the shut-off part in relation to the port flange and, when the shut-off part is distanced from the port flange, to activate an automatic blocking of the equipment.

Each control unit and thus each cooperating safety relay per port flange is assigned a transmitter/receiver. Here, the safety sensor in the port flange or in the shut-off part—in the form of an active safety sensor—is used to identify whether the complementary safety sensor in the shut-off part or in the port flange—here in the form of a passive safety sensor—is present. A transmitting/receiving element would signal wirelessly to the transmitter/receiver an absence of the passive safety sensor, whereupon the transmitter/receiver automatically communicates the absence of the passive safety sensor to the safety relay and automatically blocks the equipment.

The shut-off part—in the configuration as a separate closure body which can be docked on or removed from the port flange—or the port flange are provided with:
the capture unit, the microcontroller and an activator, which is actuatable manually or in driven fashion and serves to move the shut-off part into the blocking or open position; and
optionally with a display and a battery.

The port flange is equipped with an RFID chip, and the shut-off part—in the configuration as a separate closure body which can be docked on or removed from the port flange—is provided with a transmitting/receiving element. Here, the transmitting/receiving element is used, when placing the shut-off part on the port flange, to detect this pairing and to permit or refuse the locking of the shut-off part according to the data stored in the control unit or in the microcontroller.

Each work glove has an RFID chip, which has stored thereon an individual serial number and preferably additionally its production data, which can be read by means of the transmitting/receiving element and are stored in the control unit and/or in the microcontroller. In addition, each new action at the port flange and at the work glove is captured by means of the control unit and is stored therein for the relevant work glove, that is to say is added to the individual maintenance data.

The production data for each work glove can comprise the individual serial number, the production date, the glove size, the material type, the used sterilization method and the maximum use-by date. The maintenance data of each work glove can also comprise:
the date of installation in a port flange;
the personal data of the installer;
the identifier of the port flange on which the installation was performed;
when, how often and by which operator the shut-off part at the relevant work glove was brought into the blocking position or moved therefrom into the open position;
the time and count of the number of decontamination cycles at the work chamber of the containment and the maximum permissible number of decontamination cycles;
the time and number of the leak tests performed on the relevant work glove;
the batches and products which are handled in the work chamber of the containment and for which the relevant work glove is used;
special events to be input manually by the operator; and
the personal data of the installer performing the disassembly and disposal of the relevant work glove.

The glove insert is designed as a module that can be inserted gas-tight into the port flange and that consists of a seal that is removable or is to be opened and is arranged on one side and of the half-shell-like shut-off part that can be released from the module on the other side and the work glove packed in vacuumed fashion between the two. The glove insert provided as a module also has:
a fixing part, which has a geometry complementary to the port flange, that is to say is annular or oval, and is used for fastening to the port flange;
an extension which is intended for cooperation with a switchable holding element, which extends from the port flange, in order to temporarily secure the shut-off part; and
an RFID chip arranged in the fixing part of the glove insert.

In addition, a magnetic zone could be provided on the shut-off part, which magnetic zone is intended for cooperation with the fixing part in order to contribute to the strength of the connection between shut-off part and port flange.

Alternatively to the shut-off part, the glove insert can have a fitted cover and thus likewise a module that can be inserted gas-tight into the port flange and that consists of a seal that is removable or is to be opened and is arranged on one side and of the hood-like cover that can be released from the module on the other side and the work glove packed in vacuumed fashion between the two. This embodiment of the glove insert with the cover, instead of the shut-off part, also furthermore has:

- a fixing part which is used for fastening to the port flange; and
- an RFID chip arranged in the fixing part of the glove insert.

In addition, a magnetic zone could be provided on the cover, which magnetic zone is intended to cooperate with the fixing part in order to temporarily additionally secure the cover.

When the shut-off part is mounted on the glove insert or when the cover is in the mounted position and in the state in which the seal is intact, a negative pressure prevails in the internal volume of the glove insert between the seal and the glove surface. The internal volume of the glove insert, the face of the seal facing said internal volume, and the glove surface are sterile.

The free end of the glove is fastened to the fixing part and/or to the seal in the vicinity of the fixing part, wherein the seal at least substantially spans the clear width of the fixing part. When the shut-off part is mounted on the glove insert or when the cover is mounted and in the state in which the seal is intact, the seal is visually noticeably curved concavely relative to the glove insert as a result of the negative pressure prevailing therein.

BRIEF DESCRIPTION OF THE ACCOMPANYING DRAWINGS

Figure 2A:
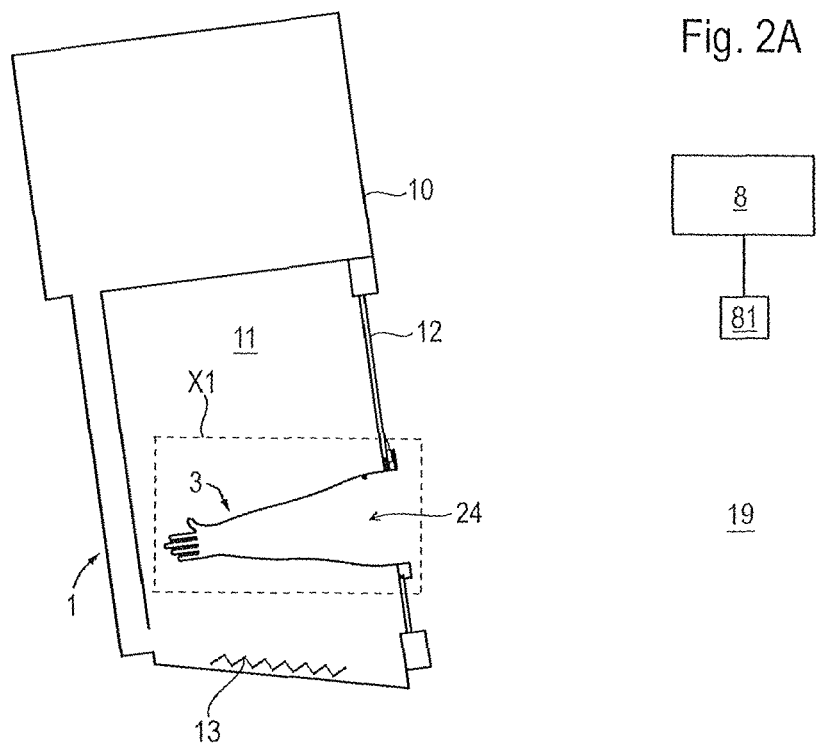
Figure 2B:
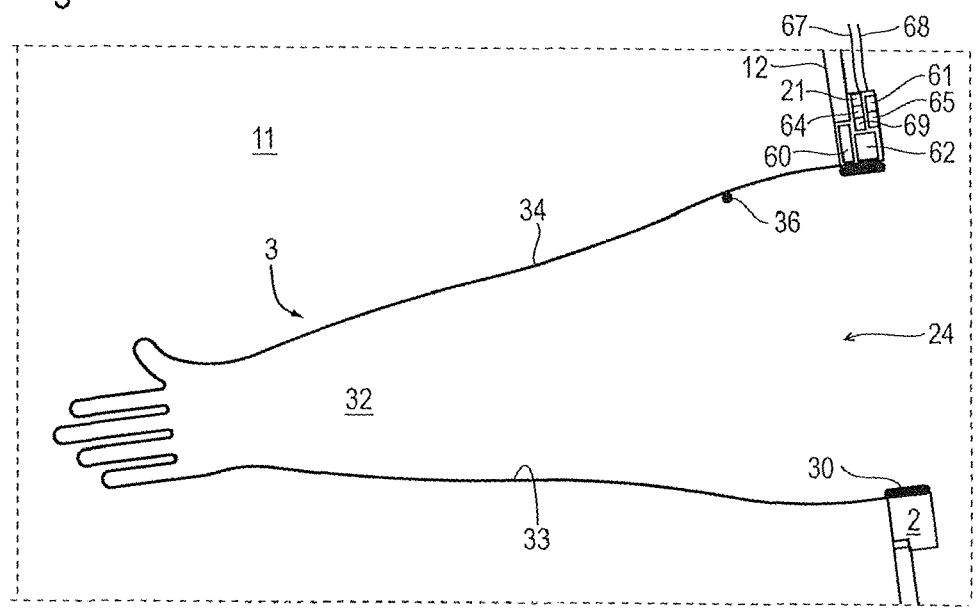
Figure 2C:
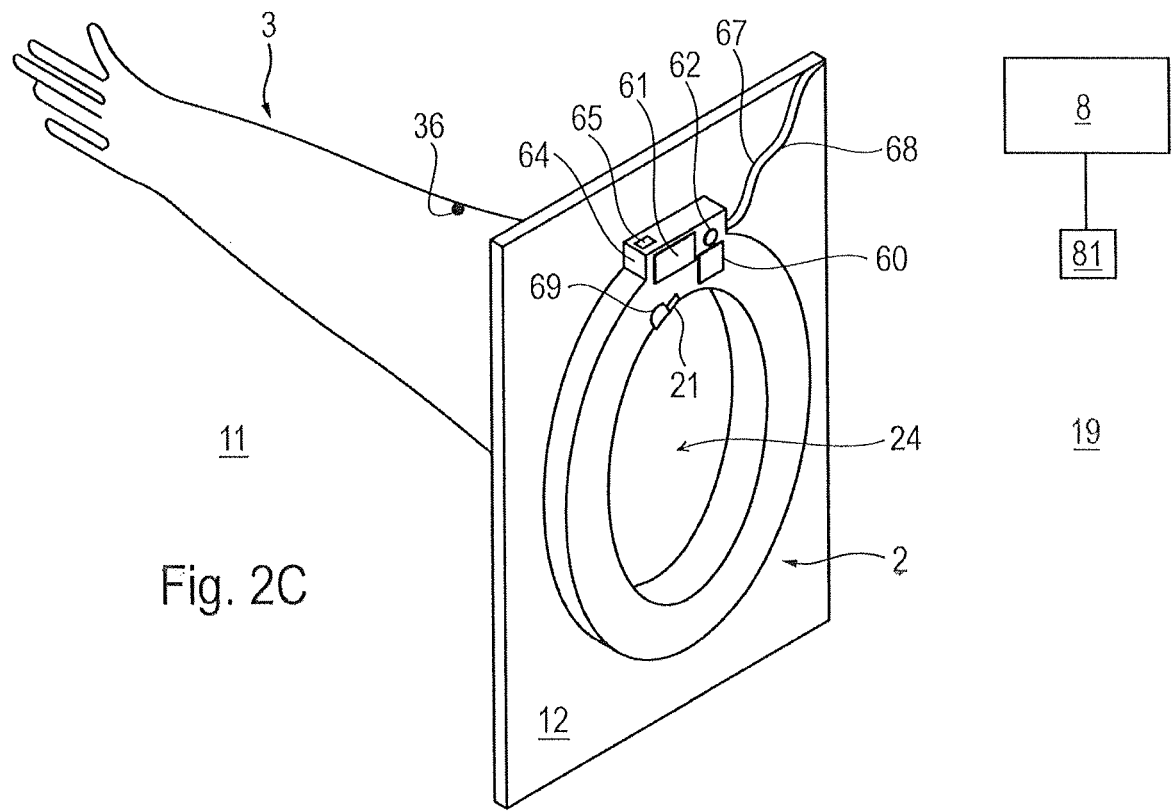
Figure 2D:
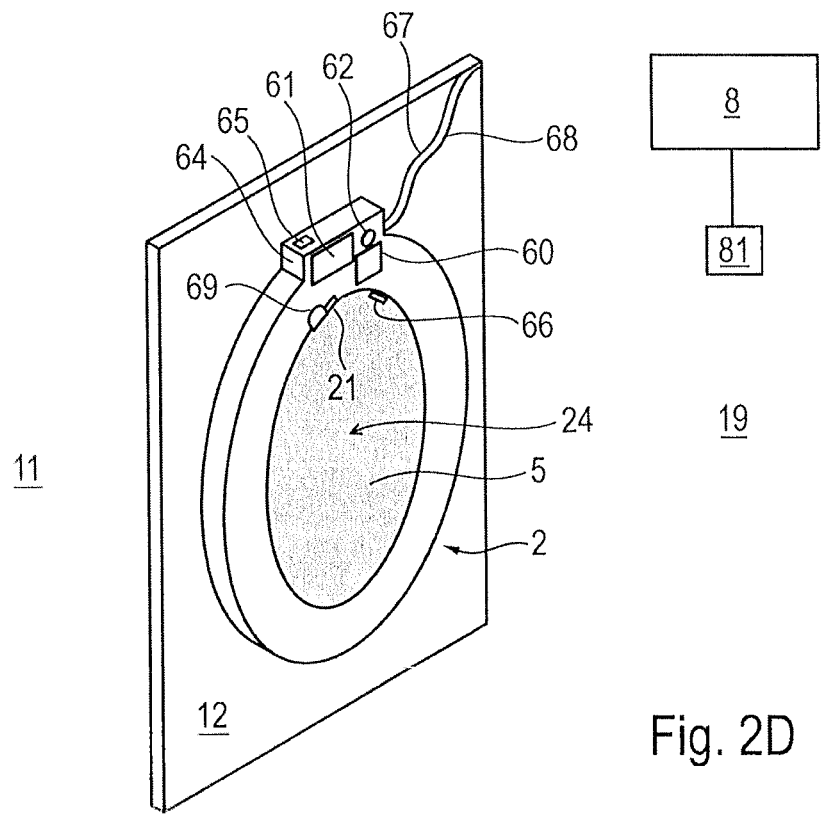
Figure 2E:
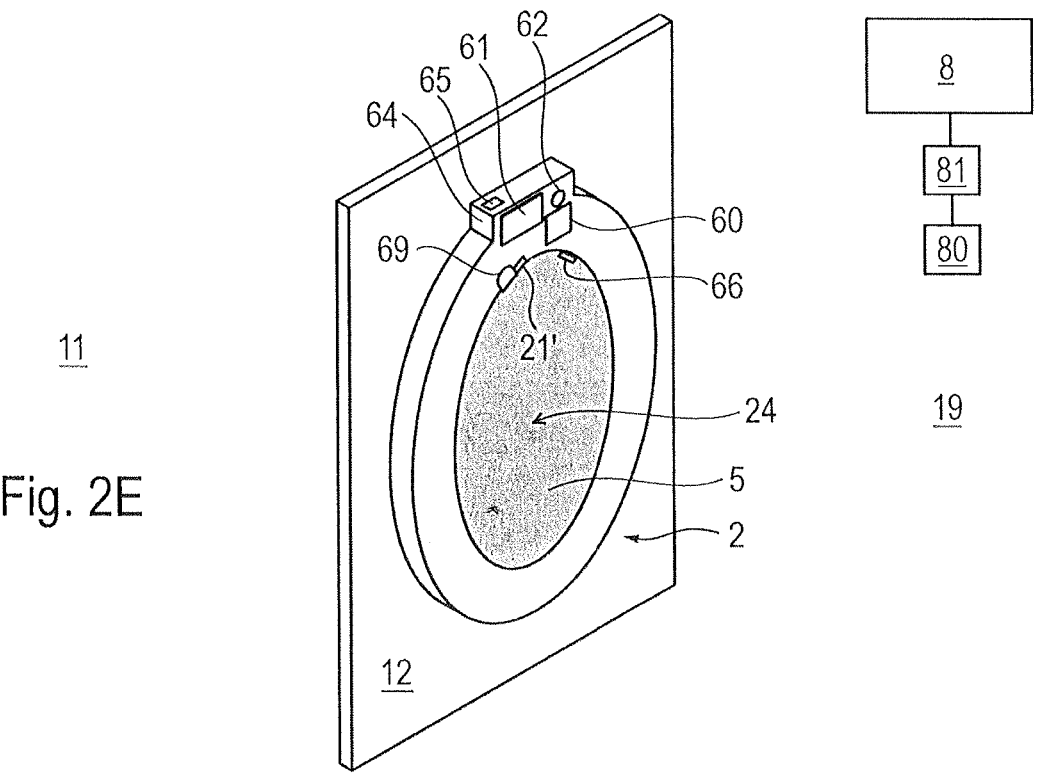
Figure 2F:
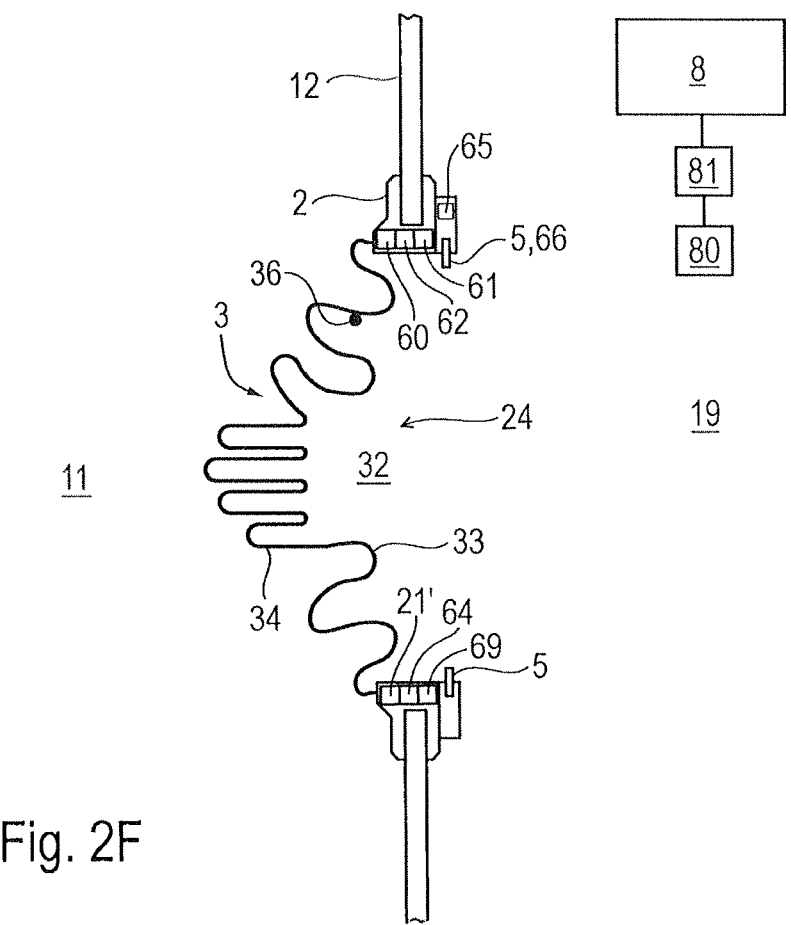
Figure 3A:
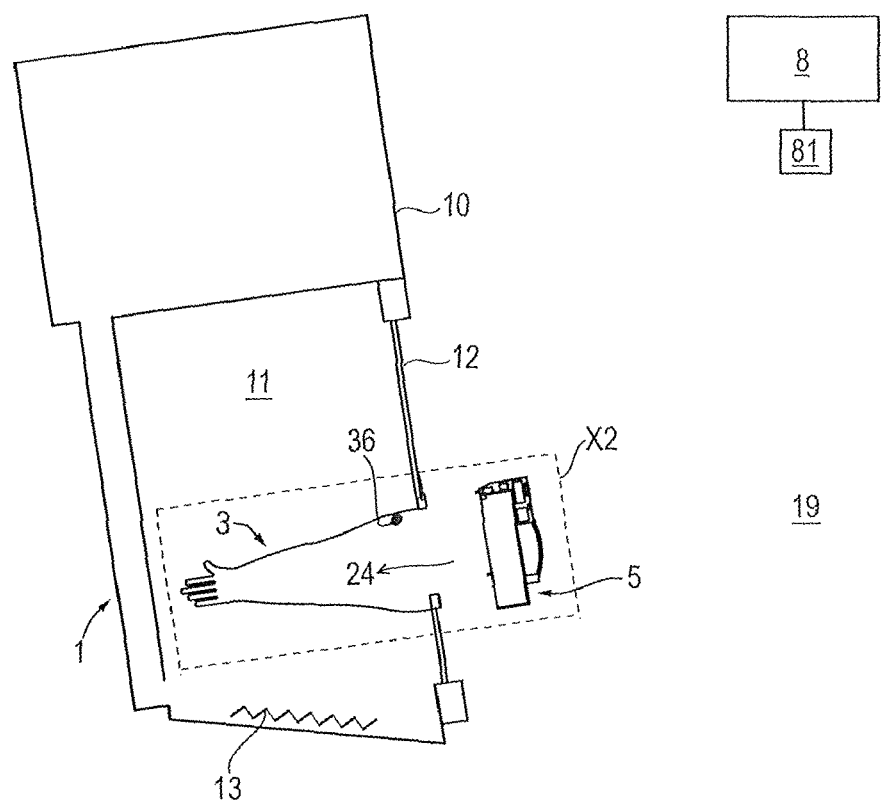
Figure 3B:
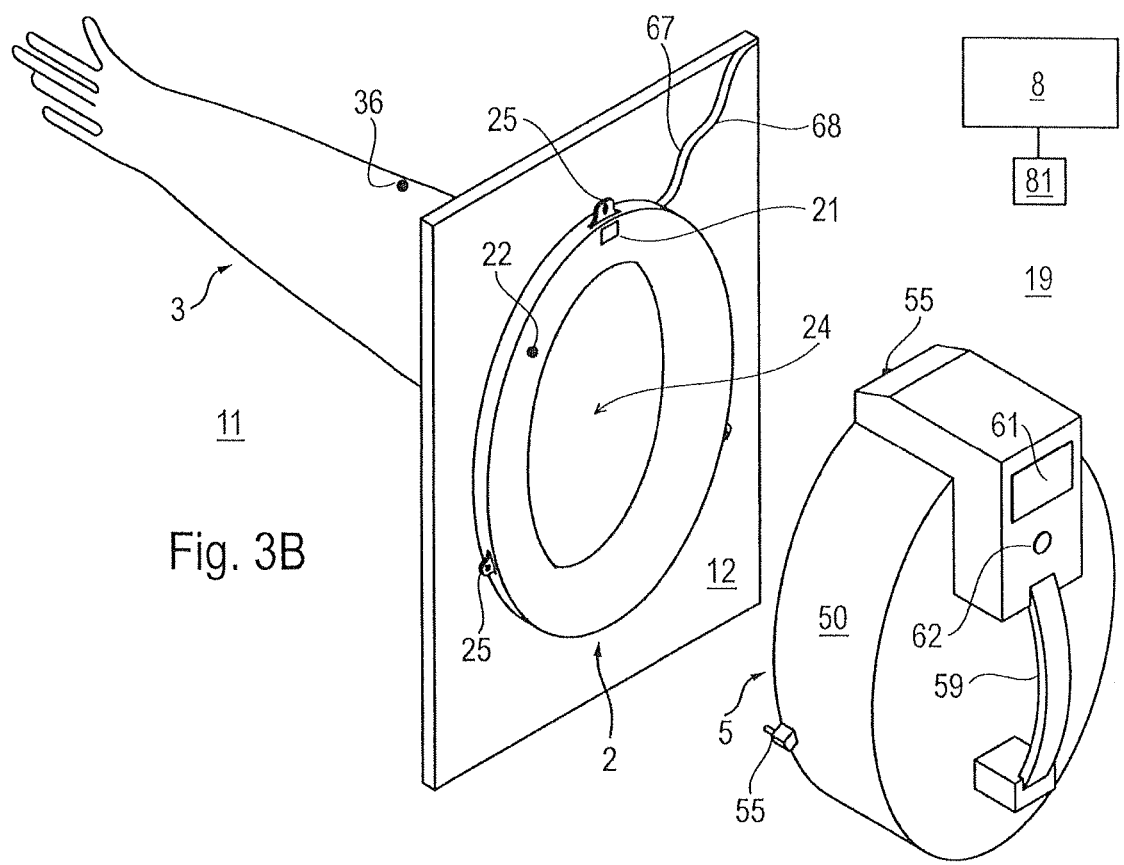
Figure 3C:
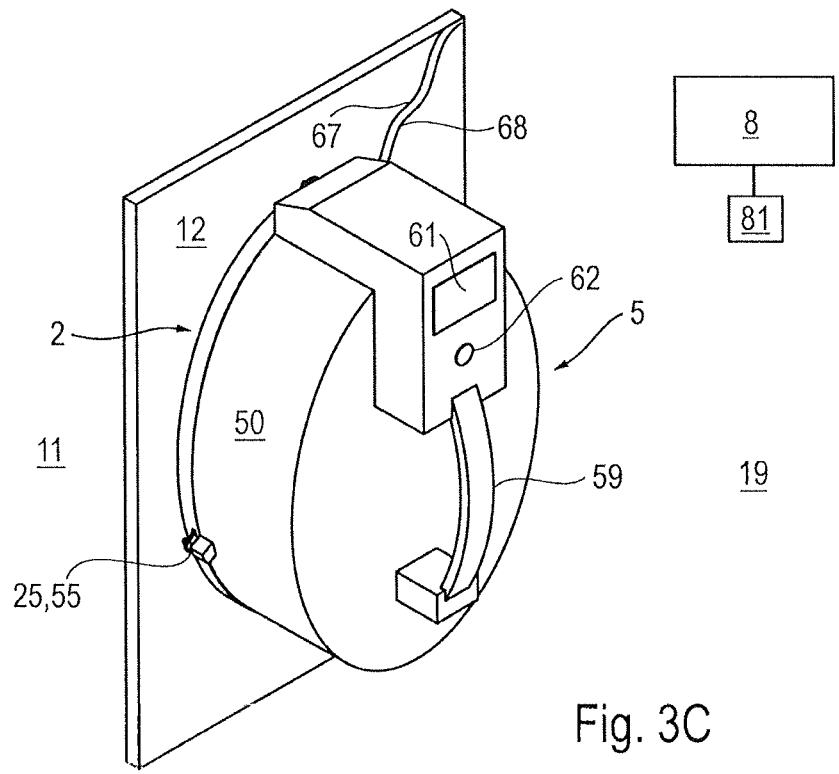
Figure 4A:
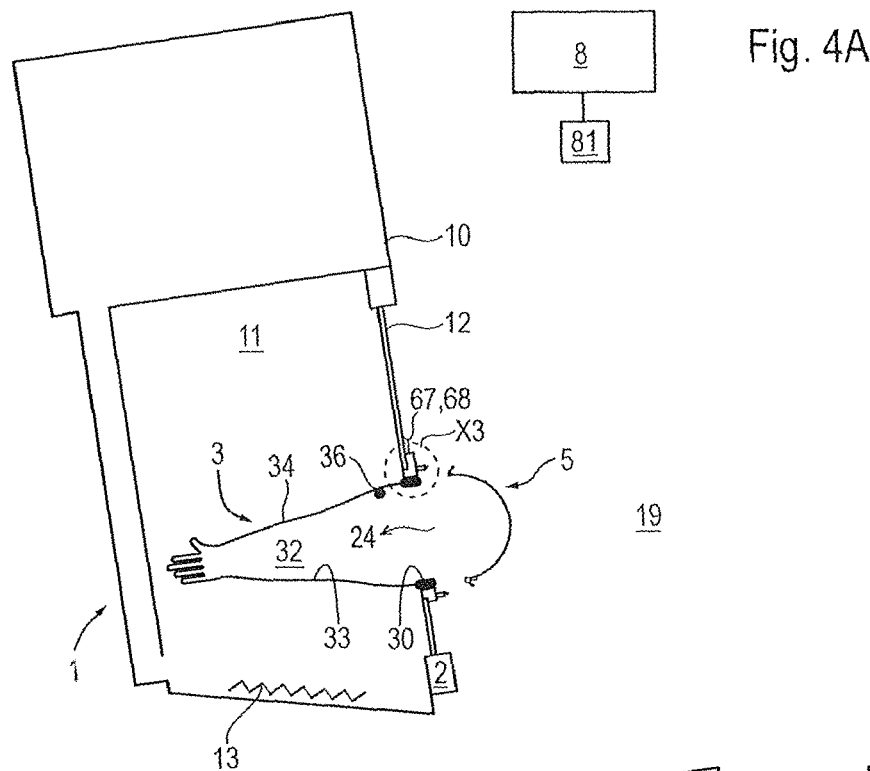
Figure 4B:
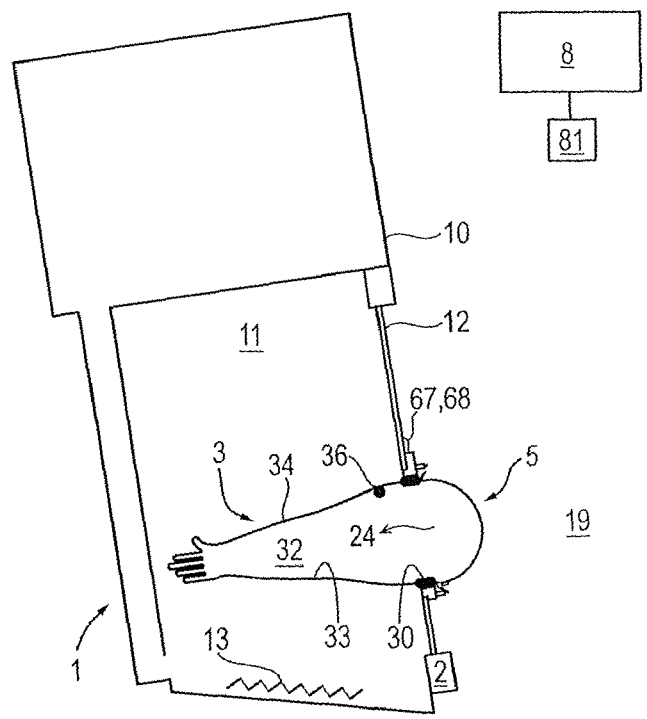
Figure 5A:
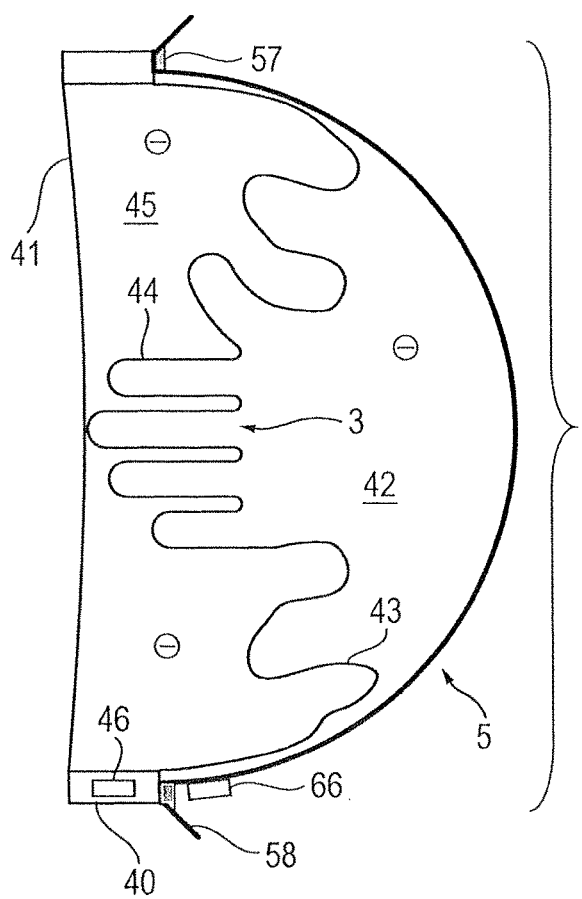
Figure 4F:
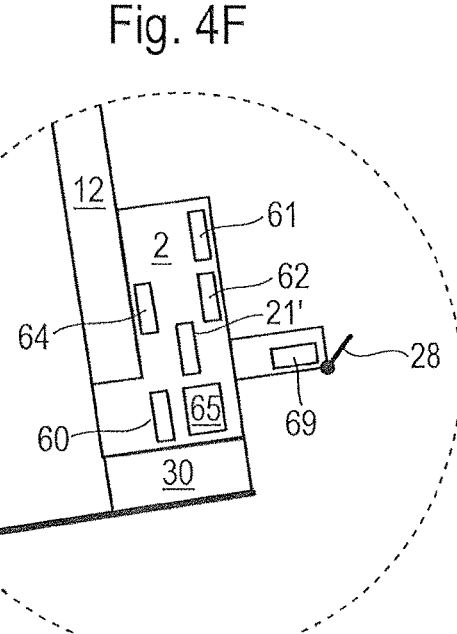
Figure 5B:
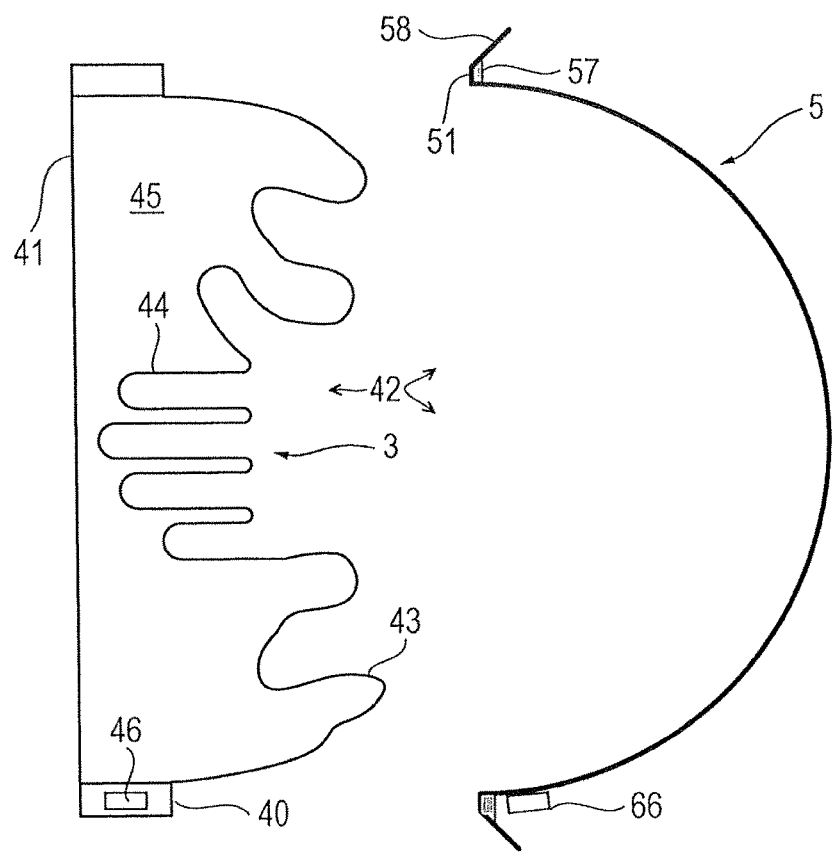
Figure 6A:
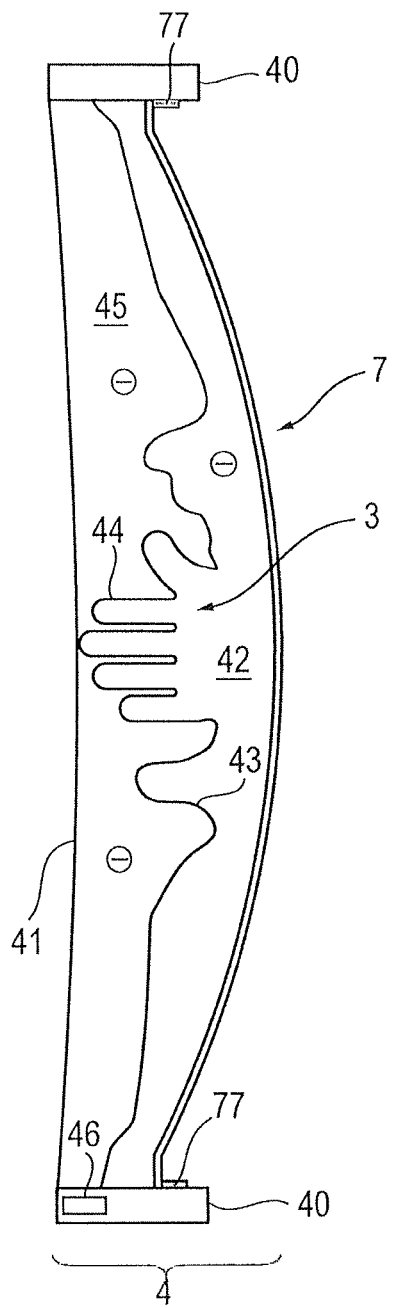
Figure 6B:
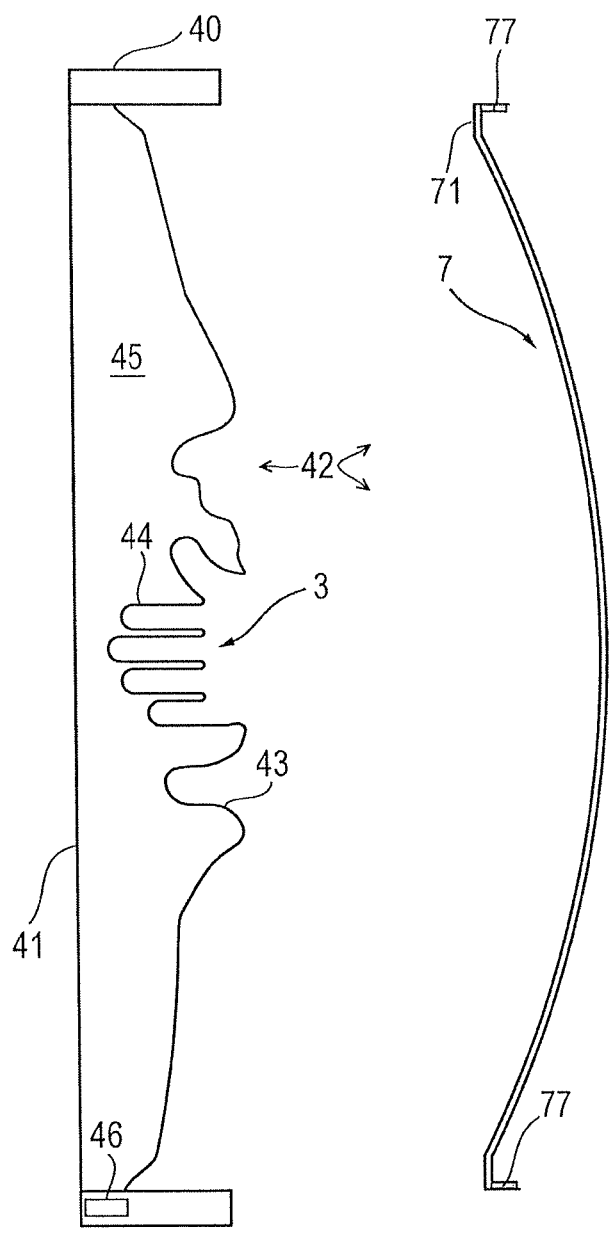
Figure 7A:
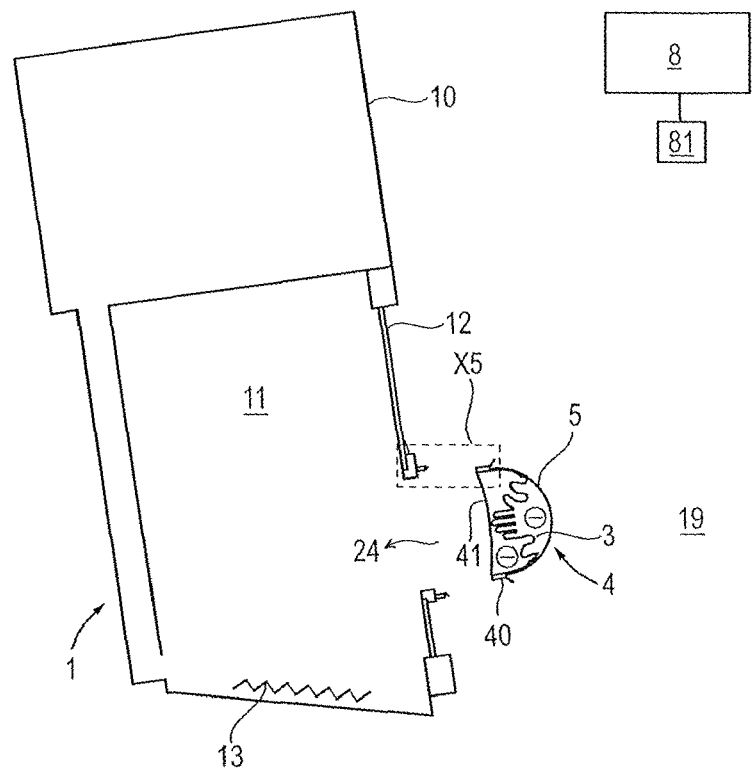
Figure 7B:
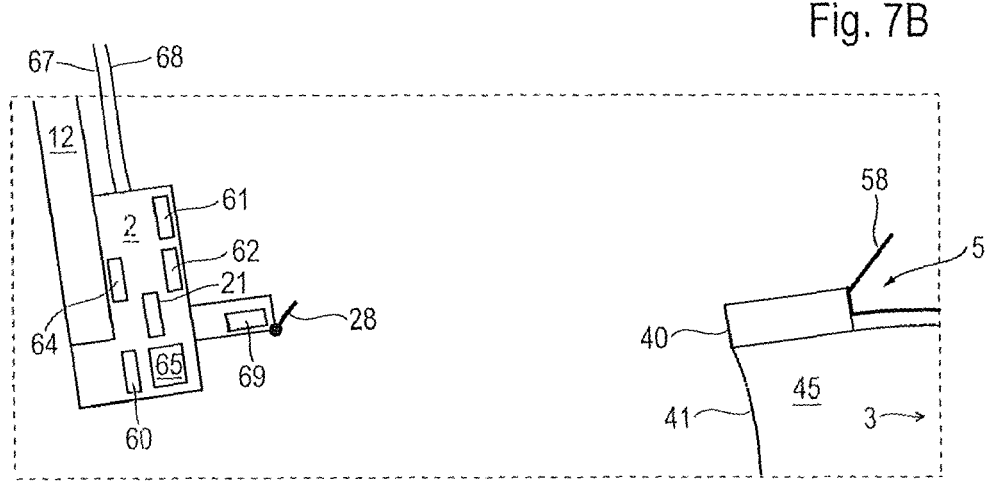
Figure 7C:
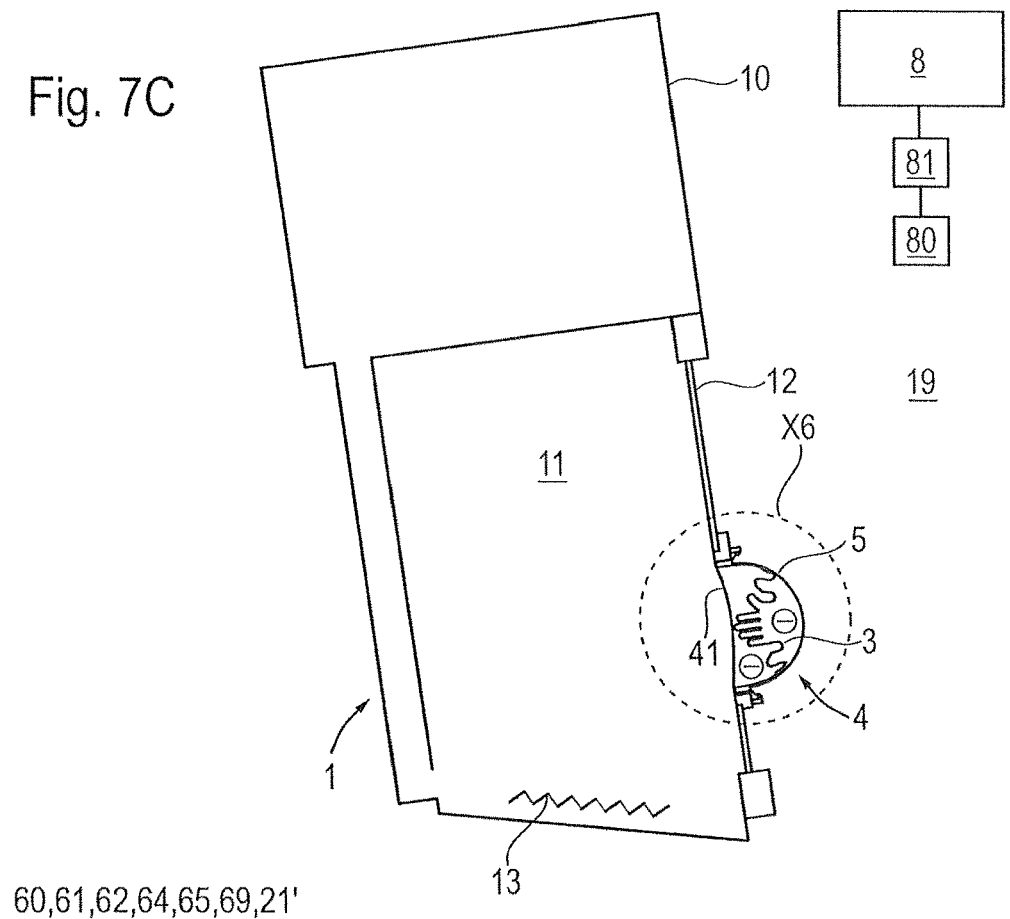
Figure 7D:
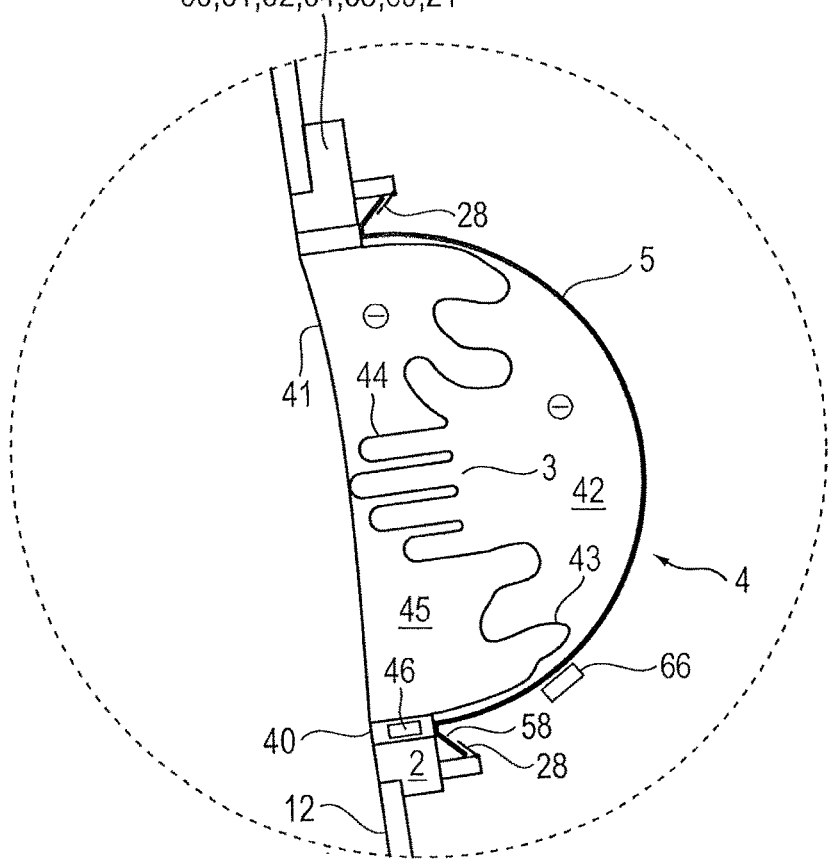
Figure 7E:
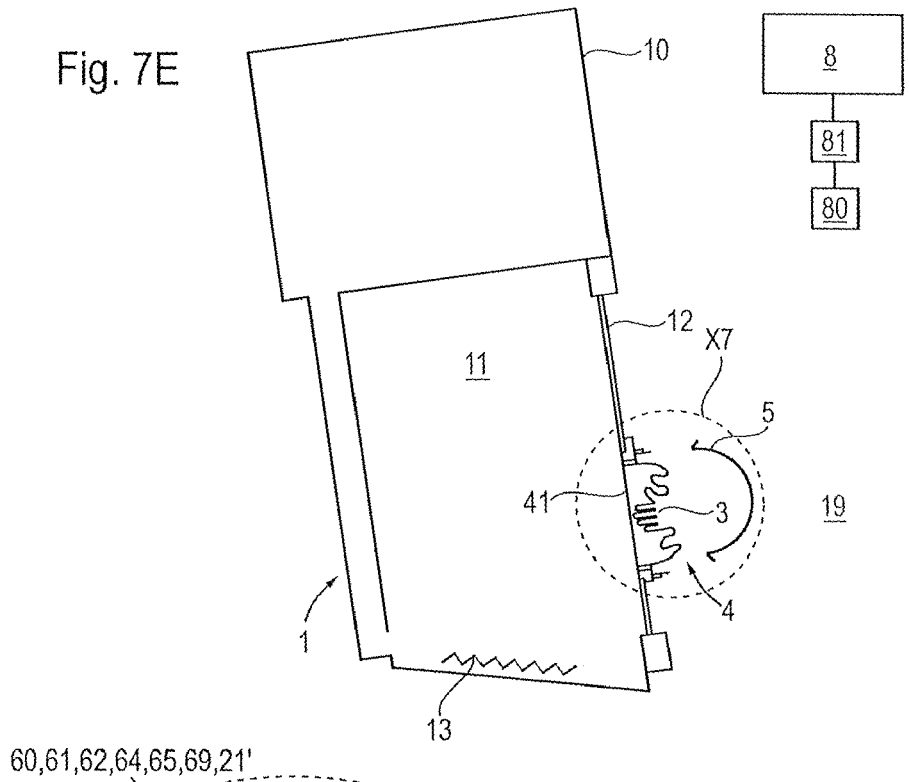
Figure 7F:
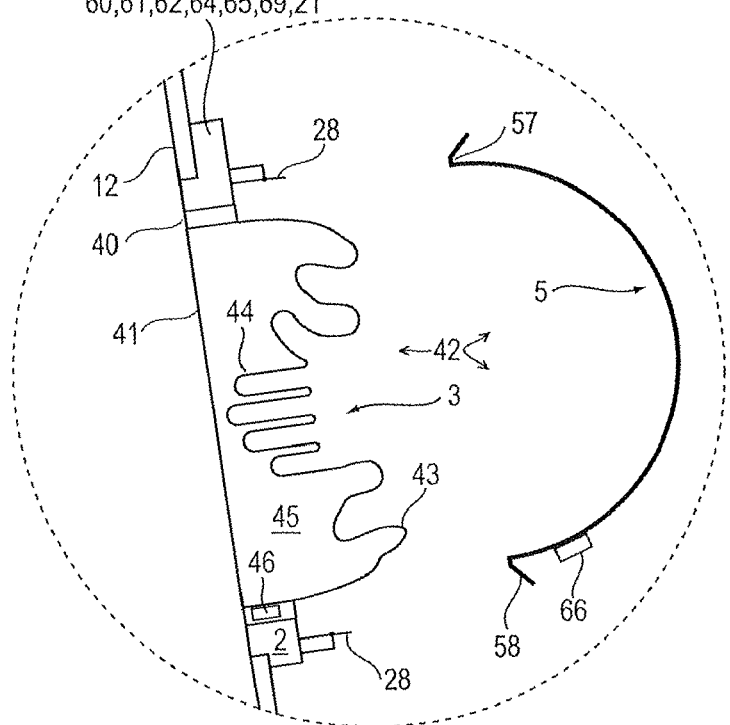
Figure 7G:
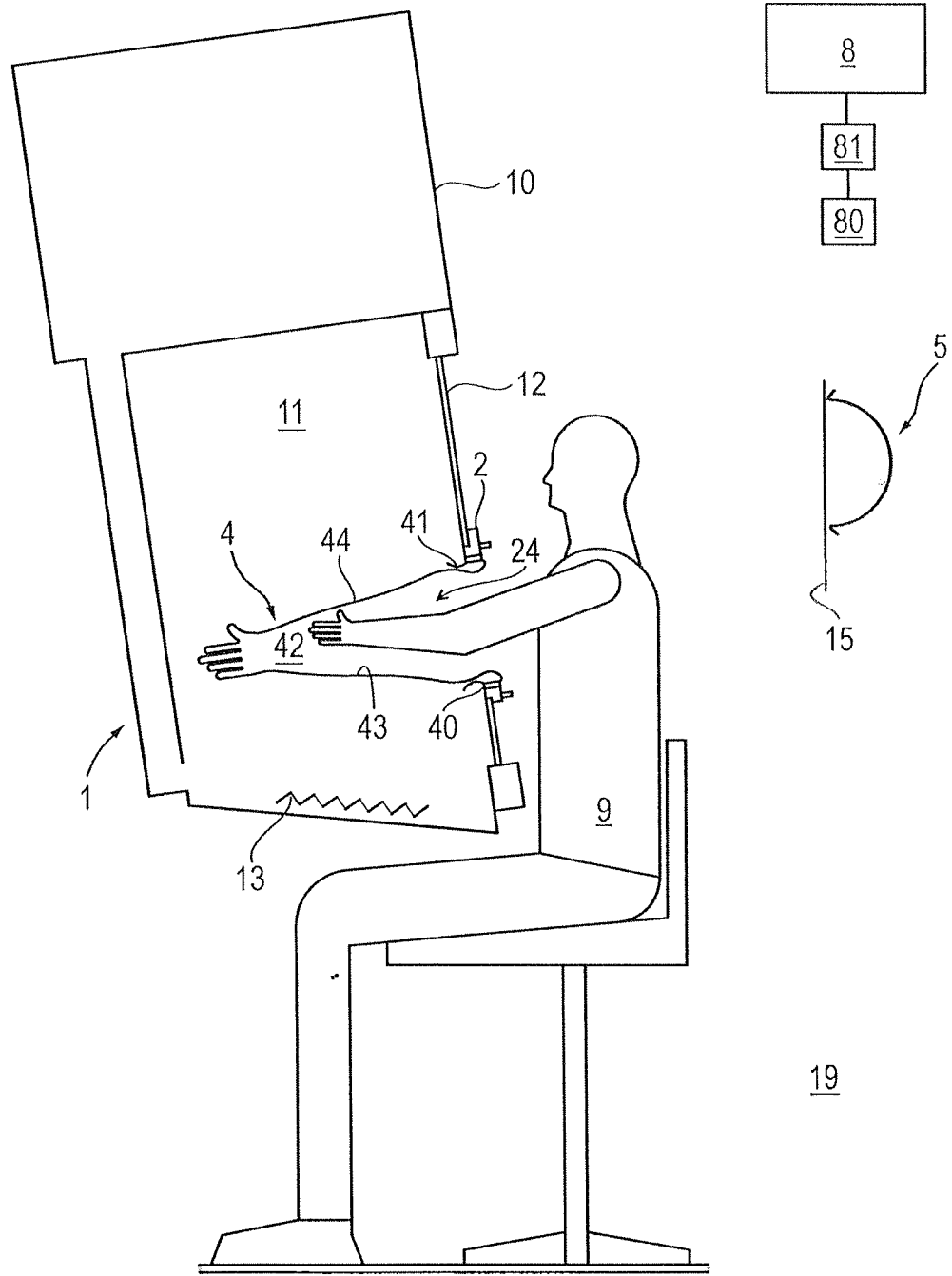
Figure 8:
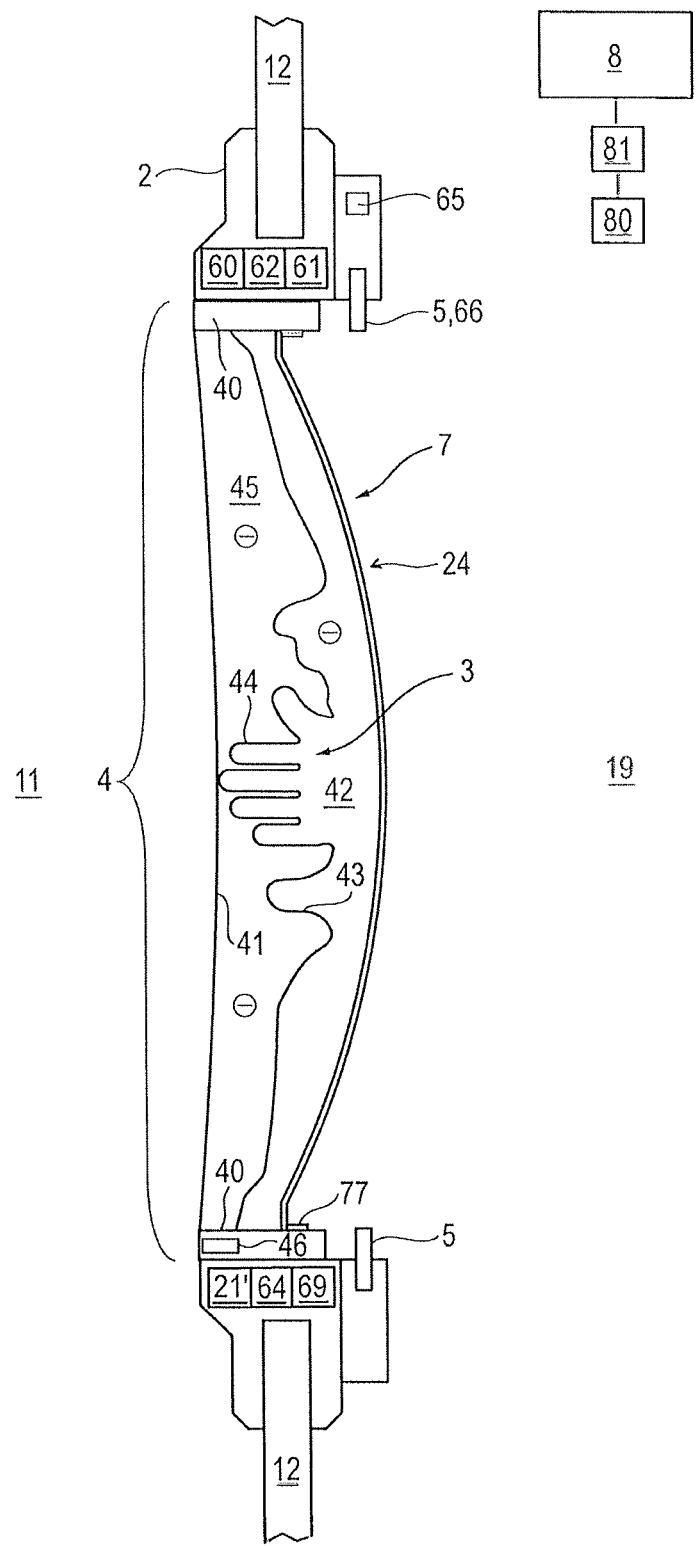
Figure 9:
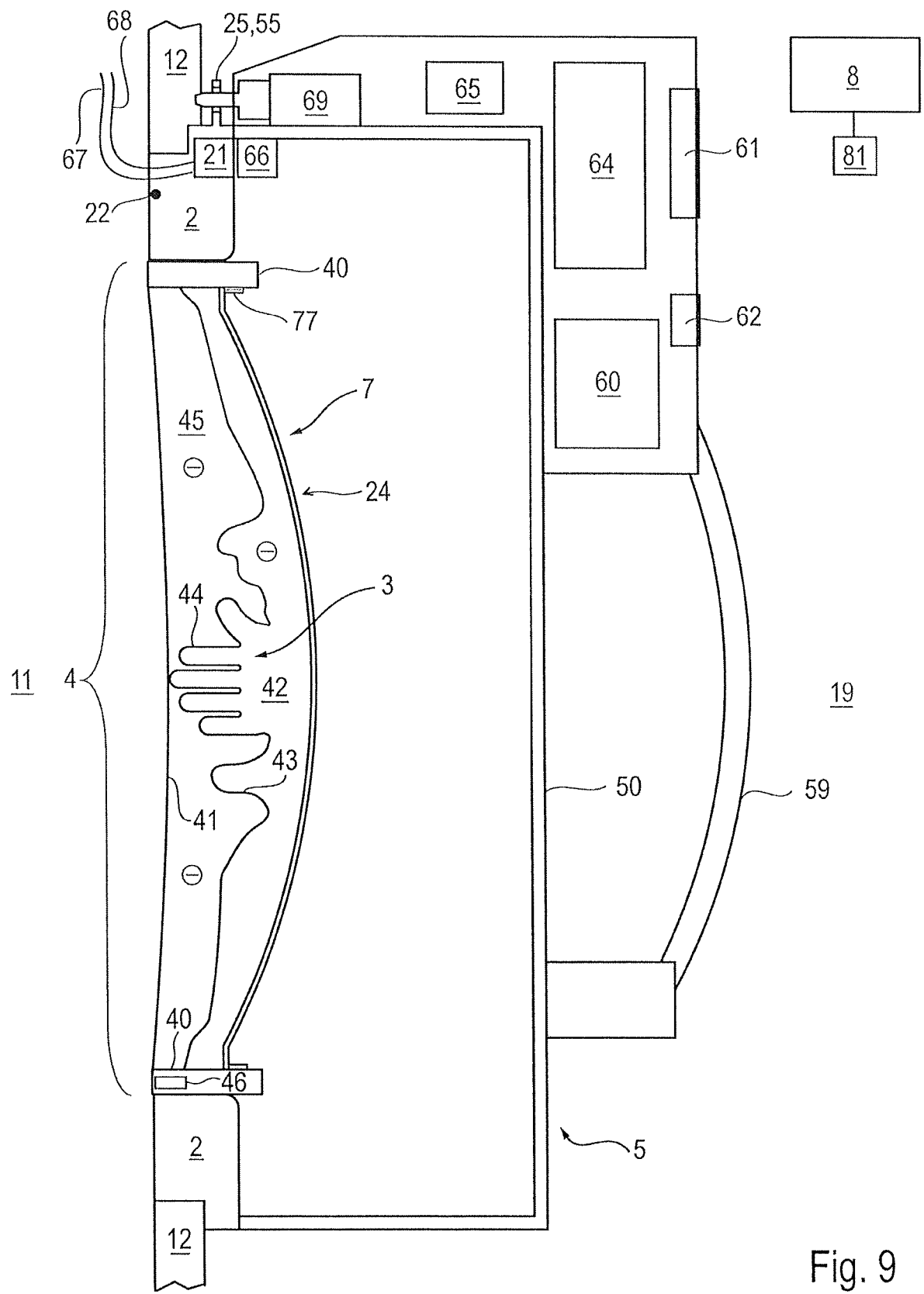

The drawings show:

FIG. 1—a containment according to the prior art which is positioned in an installation space, with a port flange inserted in the front window of the containment, a work glove fixed to the port flange, a shut-off part distanced from the access and an operator entering the work glove through the unobstructed access;

FIGS. 2A to 2F: schematic diagrams of the arrangement according to the invention in a first embodiment;

FIG. 2A—the containment from FIG. 1 with shut-off part (not visible), currently in the open position, integrated in the port flange, electronic components arranged in the port flange, wired version, and associated control unit;

FIG. 2B—the enlarged detail X1 from FIG. 2A;

FIG. 2C—the enlarged detail X1 from FIG. 2A, in a perspective view;

FIG. 2D—the illustration according to FIG. 2C with the shut-off part in the blocking position;

FIG. 2E—the illustration according to FIG. 2D with the shut-off part in the blocking position, wireless version;

FIG. 2F—an example of the shut-off part from FIG. 2A in the form of an iris diaphragm, with the shut-off part in the open position, wireless version;

FIGS. 3A to 3F: schematic diagrams of the arrangement according to the invention in a second embodiment;

FIG. 3A—the containment from FIG. 1 with separate shut-off part, currently in the open position, electronic components arranged in the shut-off part, wired version;

FIG. 3B—the enlarged detail X2 from FIG. 3A, in a perspective view;

FIG. 3C—the illustration according to FIG. 3B with shut-off part docked on the port flange, that is to say in the blocking position, and work glove compressed therein;

FIG. 3D—the illustration according to FIG. 3C, wired version, in a vertical section;

FIG. 3E—the illustration according to FIG. 3C with shut-off part docked on the port flange, that is to say in the blocking position, wireless version;

FIG. 3F—the illustration according to FIG. 3E, in a vertical section;

FIGS. 4A to 4F: schematic diagrams of the arrangement according to the invention in a third embodiment;

FIG. 4A—the containment from FIG. 1 with RFID chip arranged on the work glove and separate shut-off part from FIG. 5A, currently in the open position, wired version;

FIG. 4B—the illustration according to FIG. 4A with shut-off part docked on the port flange, that is to say in the blocking position;

FIG. 4C—the shut-off part from FIGS. 4A and 5A in an enlarged view;

FIG. 4D—the enlarged detail X3 from FIG. 4A;

FIG. 4E—the containment from FIG. 1 with RFID chip arranged on the work glove and separate shut-off part from FIG. 5A, currently in the open position, wireless version;

FIG. 4F—the enlarged detail X4 from FIG. 4E;

FIG. 5A—a work glove, formed as an insert, with intact seal and associated mounted shut-off part, that is to say in the blocking position;

FIG. 5B—the illustration according to FIG. 5A with released shut-off part, that is to say in the open position;

FIG. 6A—a work glove, formed as an insert, with intact seal and mounted cover;

FIG. 6B—the illustration according to FIG. 6A with released cover;

FIGS. 7A to 7G: schematic diagrams of the arrangement according to the invention in a fourth embodiment, with the work glove formed as an insert and associated shut-off part according to FIG. 5A;

FIG. 7A—the containment in the design according to FIG. 1, with open access and glove insert according to FIG. 4A, wired version, brought toward the open access;

FIG. 7B—the enlarged detail X5 from FIG. 7A;

FIG. 7C—the situation according to FIG. 7A with glove insert fitted on the port flange, with intact seal and mounted shut-off part, that is to say in the blocking position, wireless version;

FIG. 7D—the enlarged detail X6 from FIG. 7C;

FIG. 7E—the situation according to FIG. 7C with glove insert fitted on the port flange and released shut-off part, that is to say in the open position, wireless version;

FIG. 7F—the enlarged detail X7 from FIG. 7E;

FIG. 7G—the situation according to FIG. 7E with glove insert fastened to the port flange, with penetrated seal, released shut-off part, that is to say in the open position, and the operator entering the work chamber of the containment using the glove insert through the unobstructed access, wireless version;

FIGS. 8 and 9: schematic diagrams of mixed forms of the arrangement according to the invention;

FIG. 8—a combination with shut-off part integrated in the port flange, currently in the open position, according to the first embodiment and the glove insert with mounted cover according to FIG. 6A, wireless version; and FIG. 9—a combination of shut-off part according to the second embodiment mounted on the port flange, currently in the blocking position, and glove insert inserted into the port flange with mounted cover according to FIG. 6A, wired version.

EXEMPLARY EMBODIMENT

The arrangement according to the invention for protecting against unauthorized intervention in a containment using a work glove through an access provided in a port flange is described hereinafter in various embodiments with reference to the accompanying drawings.

The following specification applies for the entire further description. If reference signs are contained in a figure in order to clarify the drawing and it is clearly visible in the drawing that these are "recurring" components although this is not explained in the directly associated text of the description, reference should be made to the explanation of said components in the preceding description of the figures for the sake of brevity.

FIG. 1

The prior art in principle shall first be presented. A containment 1 surrounded by a housing 10 is positioned in an installation space 19, with a port flange 2 mounted in the front window 12 of said containment. The fixing part 30 provided on the work glove 3 fastens said work glove to the port flange 2. A shut-off part 5, in the configuration as described in the above "prior art" section, is momentarily distanced from the access 24 of the port flange 2, so that the operator 9 can insert his arm into the interior 32 of the work glove 3 and can thus intervene in the work chamber 11 of the containment 1 through the unobstructed access 24 in a protected manner. The work glove 3 has the inner face 33 facing its interior 32 and also the outer face 34 facing the work chamber 11. Equipment 13 usually installed in the work chamber 11 and having the function of processing material to be treated, for example pharmaceuticals or biotechnical substances, is indicated in said work chamber.

FIGS. 2A to 2D

This sequence of figures illustrates the arrangement according to the invention for protection against unauthorized intervention in a containment 1 using a work glove 3 through an access 24 provided in a port flange 2 in a first embodiment and in a wired version, with shut-off part 5 integrated directly in the port flange 2 and formed for example in a pivotable, stretchable, shutter-like or expandable manner or as an iris diaphragm. In FIGS. 2A-2C, the shut-off part 5 is in the open position, so that the access 24 is unobstructed, whereas FIG. 2D shows the shut-off part 5 in a blocking position and therefore the access 24 is blocked.

Structure of the Arrangement

Most of the electronic components are contained in the port flange 2, specifically a battery 60, a display 61, a capture unit 62, a microcontroller 64, a transmitting/receiving element 65, a passive safety sensor 66 mounted on the movable shut-off part 5 and an active safety sensor 21 fixed to the port flange 2. In addition, an activator 69 is accommodated in the port flange 2 to move the shut-off part 5. A first cable 67 and a second cable 68 are guided along the port flange 2 for signal conductance and power supply. The work glove 3 equipped with an RFID chip 36 is fastened by means of its fixing part 30 to the port flange 2 and, merely in order to illustrate its shape, is shown extending rigidly into the work chamber 11. A control unit 8, which is connected to a safety relay 81, is located externally of the containment 1.

Operating Principle of the Arrangement

Following the installation of the protective arrangement, the containment 1 can be put into operation. To this end, the work glove 3 is first brought into the correct position and the access 24 is closed at the port flange 2 by means of the shut-off part 5. The transmitting/receiving element 65 reads the serial number from the RFID chip 36 of the relevant work glove 3 and stores it in the database, provided for this purpose, in the control unit 8. If one of the work gloves 3 has already reached the maximum use-by date, this is identified by the control unit 8. The operator 9 is instructed to install a new work glove 3. The containment 1 starts the operating mode; the equipment 13 runs in the work chamber 11, for example for the purpose of filling a medicament.

If an operator 9 would now like to gain access 24 through the port flange 2 blocked by the shut-off part 5, he must identify himself to the capture unit 62. The microcontroller 64 analyzes the personal data, containing the predefined user data, received by the capture unit 62 from the database stored in the control unit 8 for access authorization. These data can also be stored individually in each microcontroller 64. The microcontroller 64 communicates wirelessly, for example via WLAN, via the transmitting/receiving element 65 with the control unit 8 and transmits the corresponding data.

If the operator 9 does not receive access authorization due to hierarchy, machine mode, current process step or status of the work glove 3 (for example ascertained damage), this is displayed on the display 61 and there is no further action. If the operator 9 is deemed to be authorized, the equipment 13 is firstly stopped in a controlled manner. The release is then transmitted via the microcontroller 64 to the activator 69, and this then opens the mechanical shut-off part 5, for example by pivoting away or opening, depending on its design. The operator 9 can now intervene in the work chamber 11 using the work glove 3 through the access 24.

As soon as the shut-off part 5 is driven by the activator 69 toward the open position, that is to say the passive safety sensor 66 is distanced from the active safety sensor 21, the active safety sensor 21 loses the signal. The active safety sensor 21 continuously transmits its signal via the first cable 67 to the safety relay 81. This stops the equipment 13 in the event of a signal interruption, or blocks the equipment 13 if this had already been switched off. It is now also impossible to re-start the equipment 13.

At the same time as the opening of the shut-off part 5, the transmitting/receiving element 65 is activated via the microcontroller 64 and reads the RFID chip 36 at the associated work glove 3 and compares the serial number thereof with the identifier stored in the control unit 8. In the control unit 8, the current intervention is then noted in the database for the relevant port flange 2.

If a critical or inadmissible state is created for the work glove 3 due to the new use, this is communicated to the operator 9 via the display 61 at the port flange 2. This information is stored in the database of the control unit 8 so that the further use of the work glove 3 is no longer possible or is only still possible under limiting conditions. These shall be defined individually by a system administrator. If damage is indicated, for example as a result of incorrect handling of the equipment 13, a work glove 3 can thus be classified as "defective and blocked for the batch".

In normal operation, power is supplied to the relevant electronic component via the second cable 68. The installed battery 60 serves as an emergency unit in the event of a power failure in order to still perform any relevant actions at the containment 1 over a limited timespan.

FIGS. 2E and 2F

This pair of figures relates to the arrangement, once again in a first embodiment, but now in a wireless version. In FIG. 2E the shut-off part 5 is in the blocking position, whereas FIG. 2F shows the shut-off part 5, in the form of an iris diaphragm, in the open position.

Structure of the Arrangement

The active safety sensor 21' is furthermore integrated in a fixed manner on the port flange 2 and the passive safety sensor 66 is in turn mounted on the movable shut-off part 5. The RFID chip 36 is mounted, unchanged, on the work glove 3, however, the first cable 67 and the second cable 68 are no longer provided for signal conductance or power supply. A transmitter/receiver 80 is now connected to the assembly formed of external control unit 8 and safety relay 81.

Operating Principle of the Arrangement

The operating principle is largely identical to the sequence of FIGS. 2A-2D, and therefore only the differences resulting from the omission of the two cables 67,68 will be described here. The battery 60 housed in the port flange 2 is now solely responsible for the power supply of the electronic components 61,62,64,65,21' and 69 contained in the port flange 2.

As soon as the shut-off part 5 is driven by the activator 69 toward the open position, that is to say the passive safety sensor 66 is distanced from the active safety sensor 21', the active safety sensor 21' loses the signal. The active safety sensor 21' continuously transmits its signal wirelessly via the transmitting/receiving element 65 to the transmitter/receiver 80, and this transmits the data, but in wired fashion, to the safety relay 81. Here too, in the event of a signal interruption the safety relay 81 stops the equipment 13 or blocks the equipment 13, if this was not switched on. Again, it is now also impossible to re-start the equipment 13.

FIGS. 3A to 3D

This sequence of figures illustrates the arrangement in a second embodiment and wired version, with the shut-off part 5, in the configuration as a separate hood-like closure body which can be docked on or removed from the port flange 2. In FIGS. 3A+3B, the shut-off part 5 is in the open position, so the access 24 is unobstructed, and the work glove 3 can extend freely from the port flange 2, whereas FIGS. 3C+3D show the shut-off part 5 in the blocking position with blocked access 24, with the work glove 3 lying here in compressed form in the hood-like shut-off part 5.

Structure of the Arrangement

Most of the electronic components, specifically the battery 60, the display 61, the capture unit 62, the microcontroller 64, the transmitting/receiving element 65 and the passive safety sensor 66, are now accommodated in the shut-off part 5, as is also the activator 69 for locking between the port flange 2 and shut-off part 5 or for their unlocking. First docking elements 25 on the port flange 2 and complementary second docking elements 55 on the shut-off part 5 are used for the locking. The active safety sensor 21 is located on the port flange 2, to which the first cable 67 and the second cable 68 as signal line and for power supply. An RFID chip 22 is mounted on the port flange 2 and the work glove 3 in turn has a further RFID chip 36. The shut-off part 5 is formed substantially by a hood-like housing 50, which has a handle 59 for facilitated handling of this shut-off part 5. The control unit 8, with the safety relay 81 connected thereto, is located externally of the containment 1.

Operating Principle of the Arrangement

The operating principle is very similar to the sequence of FIGS. 2A-2D, and therefore, in order to avoid repetitions, it appears to be sufficient to describe here only the special features which result from the now transportable shut-off part 5, the activator 69 provided therein and the first and second docking elements 25,55, which are complementary to one another.

The transmitting/receiving element 65 reads the serial numbers from the RFID chip 36 of the relevant work glove 3 and from the RFID chip 22 of the relevant port flange 2 and stores the serial number, captured from the RFID chip 36 of this work glove 3, in the database, provided for this purpose, in the control unit 8. The serial numbers captured from the RFID chips 22 of a plurality of port flanges 2 allow the assignment of a particular shut-off part 5 to the associated port flange 2. If, for example, a shut-off part 5 is fitted on a non-associated port flange 2 and the shut-off part 5 of said port flange is fitted on the other port flange 2, this mix-up is recorded in the control unit 8. Depending on the embodiment, the incorrect fitting is then communicated via the display 62, or the new positions of the shut-off parts 5 overwrite the old positions. If the shut-off parts 5 are correctly mounted, the first and second docking elements 25,55 are oriented relative to one another, and they are locked by the actuation of the activator 69.

If the operator 9 intends to gain access 24 through the port flange 2 blocked by the shut-off part 5 and has been identified as authorized for access, the equipment 13 is first stopped in a controlled manner. The release is then transmitted via the microcontroller 64 to the activator 69, and this then unlocks the first and second docking elements 25,55 from one another, so that the operator 9 can remove the shut-off part 5 and the access 24 is unobstructed for intervention in the work chamber 11 using the work glove 3.

As soon as the shut-off part 5 is removed from the blocking position, that is to say the passive safety sensor 66 is also removed from the active safety sensor 21, the active safety sensor 21 loses the signal, and consequently the equipment 13 is stopped or blocked. As described for the sequence of FIGS. 2A-2D, the current intervention is detected and is noted in the database, provided in the control unit 8, for the relevant port flange 2. Provided the port flange 2 is locked with the shut-off part 5, the battery 60 installed therein is charged from the mains via the second cable 68, and the power supply is also provided via the second cable 68. If, however, the shut-off part 5 is unlocked and removed from the port flange 2, the battery 60 alone ensures the power supply of the electric components 61,62,64,65 and 69 contained in the shut-off part 5.

FIGS. 3E and 3F

This pair of figures relates to the arrangement, once again in a second embodiment, but now in a wireless version. The shut-off part 5 is fitted on the port flange 2 and locked thereto, so that the access 24 is blocked and the work glove 3 lies in compressed form in the hood-like shut-off part 5.

Structure of the Arrangement

Due to absence now of the first cable 67 and second cable 68 for signal conductance and power supply, in contrast to the sequence of FIGS. 3A-3D, the active safety sensor 21' and the passive safety sensor 66 are swapped in respect of their installed positions. The passive safety sensor 66 is now integrated in a fixed manner on the port flange 2, whereas the active safety sensor 21' is now mounted in the shut-off part 5. The work glove 3 is again equipped with an RFID chip 36. The transmitter/receiver 80 is again connected to the assembly formed of external control unit 8 and safety relay 81.

Operating Principle of the Arrangement

The operating principle is almost identical to the sequence of FIGS. 3A-3D, so that repetitions can be avoided and only the differences resulting from the change of the installation positions for the active safety sensor 21' and the passive safety sensor 66 are described here. The battery 60 in the shut-off part 5 ensures the complete power supply for the electronic components 21',61,62,64,65 and 69 contained therein.

As soon as the shut-off part 5 is lifted off the port flange 2, causing its active safety sensor 21' to be distanced from the passive safety sensor 66 mounted in the port flange 2, the active safety sensor 21' loses the signal. The active safety sensor 21' continuously transmits its signal wirelessly via the transmitting/receiving element 65 to the transmitter/receiver 80 and the latter then transmits the data in wired fashion to the safety relay 81. As a result of the signal interruption, the safety relay 81 stops the equipment 13, or blocks the equipment 13 if it was not switched on.

FIGS. 4A to 4D

This sequence of figures illustrates a third embodiment in a wired version, with the shut-off part 5 in the configuration as a separate half-shell-like closure body which can be docked on or removed from the port flange 2. In FIGS. 4A+4D, the shut-off part 5 is in the open position so that the access 24 is unobstructed and the work glove 3 can extend freely from the port flange 2, whereas FIG. 4B shows the shut-off part 5 in the blocking position with blocked access 24 and the work glove 3 extending into the work chamber 11. FIG. 4C shows such a separate shut-off part 5 with its construction details.

Structure of the Arrangement

As shown in accordance with FIG. 2B, the port flange 2 contains all electronic components 21,60,61,62,64,65 and 69, and again the work glove 3 is fastened to the port flange 2 by its fixing part 30. As a special feature, a lever-like retaining element 28 is attached to the port flange 2 and can be switched to an "open" position and a "closed" position. The work glove 3 is again equipped with an RFID chip 36. For the signal conductance and power supply, the two cables 67,68 lead to the port flange 2. Again, the control unit 8, with the safety relay 81 connected thereto, is located externally of the containment 1. The half-shell-like shut-off part 5 is preferably made of plastic and has, at its edge, an angled, hook-like extension 58, a magnetic zone 57 adjacent to it and the passive safety sensor 66 mounted close to the magnetic zone 57.

Operating Principle of the Arrangement

The provisions for starting up the system, determining and granting access authorization for the operator 9, transferring the shut-off part 5 to the blocking position and thus blocking the access 24, as well as reading the serial number from the RFID chip 36 on the work glove 3 and storing it in the database of the control unit 8 are carried out in an equivalent manner to the sequence according to FIGS. 2A-2D. A certain particular feature arises during the closing of the access 24, when the shut-off part 5 is fitted on the port flange 2 and these are locked with each other. For this purpose, the retaining element 28 must first be in the "open" position so that the extension 58 can be inserted under the retaining element 28. After authorization has been granted for the locking, the activator 69 then switches the retaining element 28 to the "closed" position so that the retaining element 28 and the extension 58 engage with each other. The magnetic zone 57 on the shut-off part 5 contributes to the strength of the connection between the shut-off part 5 and port flange 2.

If the operator 9 intends to gain access 24 through the port flange 2 blocked by the shut-off part 5 and access authorization has been granted, the equipment 13 is first stopped in a controlled manner. Then, the release is transmitted via the microcontroller 64 to the activator 69, and the latter then switches the retaining element 28 in the "open" position so that the retaining element 28 and extension 58 come out of engagement, whereupon the operator 9 can remove the shut-off part 5 and the access 24 becomes unobstructed for intervention in the work chamber 11 using the work glove 3. The interaction of both safety sensors 21,66, signal processing and stopping of the equipment 13 in case of signal interruption as well as detection and recording of the current intervention, including the power supply in normal operation and the function of the battery 60 installed in the port flange 2 as an emergency unit in case of power failure, correspond to the description given for FIGS. 2A-2D.

FIGS. 4E and 4F

This pair of figures further relates to the arrangement in a third embodiment, but now in a wireless version. The shut-off part 5 is removed from the port flange 2, so that the access 24 is unobstructed and the previously authorized operator 9 can enter the work chamber 11 using the work glove 3.

Structure of the Arrangement

With the two cables 67,68 no longer present for signal conductance or power supply, the sole power supply from the battery 60 installed in the port flange 2 and the continued lack of power supply to the shut-off part 5, the active safety sensor 21' is integrated in the port flange 2 and the passive safety sensor 66 is mounted on the shut-off part 5—virtually unchanged. The work glove 3 is again equipped with an RFID chip 36. The transmitter/receiver 80 is again connected to the assembly of external control unit 8 and safety relay 81.

Operating Principle of the Arrangement

The battery 60 in the port flange 2 alone provides the power supply for the electronic components 21',61,62,64,65 and 69 contained in the port flange 2. Furthermore, differing somewhat from the pair of FIGS. 3E+3F and the sequence of FIGS. 4A-4D, the following occurs when the shut-off part 5 is removed from the port flange 2, which is only made possible once authorization has been granted and the holding element 28 has been switched to the "open" position: The passive safety sensor 66 located on the shut-off part 5 is distanced from the active safety sensor 21' mounted in the port flange 2, whereupon said safety sensor detects a signal interruption. The active safety sensor 21' continuously transmits its signal wirelessly via the transmitting/receiving element 65 to the transmitter/receiver 80 and the latter then transmits the data in wired fashion to the safety relay 81. Due to the signal interruption, the safety relay 81 stops the equipment 13 or blocks it if it was not switched on.

FIGS. 5A to 6B

The pair of FIGS. 5A+5B illustrates a glove insert 4 which is composed of a work glove 3, a fixing part 40, a seal 41 and a shut-off part 5. The pair of FIGS. 6A+6B relates to a glove insert 4 to which a cover 7 belongs instead of the shut-off part 5.

According to the prior art, conventional work gloves 3 are installed in the port flanges 2 of containments 1 (see FIG. 1). The work glove 3 is pulled over a generally removable ring and is usually sealed with O-rings. In preparation for the start of production mode at the containment 1, it is already mandatory to check the work glove 3 for leaks—using test equipment—which requires additional equipment and time at the site, for example at the pharmaceutical manufacturer.

Furthermore, the complete outer surface 34 of the work glove 3 facing the work chamber 11 must be decontaminated together with the containment 1. For this purpose, so-called glove stretchers (see, for example, CH 707 655 A1 originating from the applicant) are usually inserted into the work glove 3 in order to treat all surface areas with sufficient intensity by stretching with the applied $H_2O_2$ gas flow, for example. Due to the large and strongly formed outer surface 34, a correspondingly long decontamination time is required. Frequent decontaminations or cleanings are necessary, especially in the case of aseptically or toxically operated containments 1, often with the requirement to fit completely new work gloves 3, so that the effort described above is repeated. Thus, the need arises to design a work glove in such a way that it provides a shut-off part itself or can be used in combination with a separate shut-off part to protect against unauthorized intervention, while at the same time the effort required prior to use of the work glove 3 at the location of the containment 1 equipped with it, for example at the pharmaceutical producer, is significantly reduced.

FIGS. 5A and 5B

This pair of figures relates to a glove insert 4, which is formed as a module that can be inserted gas-tight into the port flange 2. On the one hand, the glove insert 4 has a seal 41 which is removable or is to be opened and which spans an annular fixing part 40, and on the other hand the half-shell-like shut-off part 5, which is attached tightly to the fixing part 40 but can be released. The fixing part 40 could also be oval, depending on the geometry of the port flange 2. Between the seal 41 and the shut-off part 5 there lies the work glove 3 vacuum-packed in compressed form. The fixing part 40 further serves to fasten the open glove end and to fasten the glove insert 4 to the port flange 2. The glove end could alternatively be fastened to the fixing part 40 and/or to the seal 41. An RFID chip 46 is arranged in the fixing part 40 and could be writable for the purpose of recording all new actions at the glove insert 4, including at the work glove 3. At the work glove 3, the inner face 43 and the surface 44 are designated. Between the shut-off part 5 adhering to the fixing part 40 and the inner face 43 there lies the interior 42, while between the seal 41 and the surface 44 there is defined a front space 45.

The shut-off part 5 is preferably made of plastic and has an angled, hook-like extension 58 on its edge 51. Preferably close to the edge 51, a passive safety sensor 66 is attached. Optionally, a magnetic zone 57 can be provided, for example adjacently to the edge 51, and could be usable to hang the shut-off part 5 removed from the glove insert 4 installed in the port flange 2 close to a suitable parking station 15 (see FIG. 7G).

The extension 58 is designed to cooperate with a switchable retaining element 28 extending from the port flange 2 to temporarily secure the shut-off part 5 against unauthorized removal (see FIGS. 7C+7D). A releasable interlocking and/or frictionally engaged connection of the shut-off part 5 to the fixing part 40 consists, for example, of a shaping at the edge 51 and/or extension 58 of the shut-off part 5 with complementary shaping at the fixing part 40, an adhesive or a predetermined breaking point between the fixing part 40 and the shut-off part 5.

When the shut-off part 5 is sealed to the fixing part 40 and the seal 41 is intact (see FIG. 5A), a negative pressure prevails in the interior 42 and in the front space 45. At least the front space 45 with the faces facing it, namely the surface 44 and the inner face of the seal 41, are sterile. Preferably, in the initial situation, the interior 42 with the faces facing it, namely the inner face 43 and the inner side of the shut-off part 5, are also sterile. In the initial situation, the negative pressure existing in the front space 45 causes a concave curvature of the seal 41, which forms an advantageous visual indicator of the correct condition of the glove insert 4.

Once the shut-off part 5 has been removed from the fixing part 40, but the seal 41 remains intact (see FIG. 5B), the interior 42 is open to the atmosphere. The negative pressure previously prevailing in the front space 45 of the glove insert 4 also equalizes to the atmospheric pressure due to the elasticity of the work glove 3 and seal 41, so that the previously concave curvature of the seal 41 is cancelled out by the pressure equalization that occurs.

The factory-pre-sterilized, packaged glove insert 4, which is already largely prepared for installation, results in a significant saving of time and equipment at the location of the containment 1, for example for the pharmaceutical manufacturer, and at the same time in increased product safety. The pulling over onto the ring provided for this purpose, which is necessary with conventional work gloves 3 when fitting them into the port flange 2, is no longer required. The glove insert 4 with the fixing part 40 can be inserted as a module into the port flange 2 in a very practical manner, for example by means of a gas-tight screw-in or lockable detent, bayonet or clip mechanism, thereby simultaneously reducing the risk of installation errors. The glove insert 4 is tested for tightness during factory production and is then vacuum-packed, wherein a preserved concave curvature of the seal 41, which is under mechanical tension, indicates the continued tightness, i.e. the correct condition. The leak test that is otherwise mandatory for conventional work gloves 3 after installation can be omitted in the case of the glove insert 4. The sterilization of the glove insert 4 already carried out at the factory by means of a radiation source or gassing device results in a higher degree of cleanliness than decontamination during the state installed in the containment 1. Moreover, the decontamination time for the installed pre-sterilized glove insert 4 is reduced compared to conventional work gloves 3, since only the outer face of the seal 41 facing the work chamber 11 of the glove insert 4 must be decontaminated, but no longer the entire intricately structured outer face 34 of the work glove 3.

FIGS. 6A and 6B

This pair of figures also relates to a pre-sterilized glove insert 4 which can be inserted gas-tight into a port flange 2, which differs from the previous pair of FIGS. 5A+5B only in that, instead of the previously present shut-off part 5, a cover 7 is now provided which is simpler in respect of its function and construction. The seal 41, the fixing part 40 and the vacuum-packed, compressed work glove 3 are again present, but now shielded by the shell-like cover 7, which is attached to the fixing part 40 in a gas-tight but releasable manner.

The fixing part 40 spanned by the seal 41, in which fixing part the RFID chip 46 is mounted, again serves to fasten the open glove end and also to fasten this glove insert 4 to the port flange 2. Here, too, the glove end could alternatively be fixed to the fixing part 40 and/or to the seal 41. Likewise present are the inner face 43 and surface 44 as well as the front space 45 lying between the seal 41 and the surface 44. Only the interior 42 is now to be defined as lying between the inner face 43 and the cover 7 adhering to the fixing part 40. As a result of the limited function of the cover 7—no longer to be used as a shut-off part 5—the passive safety sensor 66 and the extension 58 are omitted from the cover 7.

The cover 7 is also preferably made of plastic and could have a magnetic zone 77 adjacent to the edge 71, which magnetic zone would be useful for the same purpose as the magnetic zone 57 on the shut-off part 5 (see FIG. 7G). A releasable interlocked and/or positively engaged connection of the cover 7 to the fixing part 40 consists, for example, of a shaping at the edge 71 of the cover 7 with complementary shaping at the fixing part 40, an adhesive or a predetermined breaking point between fixing part 40 and cover 7.

The pressure conditions in and on the glove insert 4, with the cover 7 mounted in sealed fashion on the fixing part 40 and with the seal 41 intact, the concave curvature of the seal 41 adapting thereto, and also the sterile areas (see FIG. 6A), are equivalent to the glove insert 4 in the state according to FIG. 5A. With the cover 7 removed from the fixing part 40 and the seal 41 still intact, the situation is similar to that according to FIG. 5B with regard to the cancelled curvature of the seal 41 and the sterile area in the front space 45 (see FIG. 6B).

FIGS. 7A and 7B

This pair of figures illustrates the arrangement with the glove insert 4 according to FIGS. 5A+5B in a fourth embodiment and in a wired version, with the shut-off part 5 as the work glove 3 supplemented to form the glove insert 4. The access 24 into the work chamber 11 is open. The fact that the glove insert 4 has not yet been used, i.e. the internal pre-sterilized state has been preserved and the shut-off part 5 is mounted gas-tightly as a releasable component on the fixing part 40, can be seen from the concave curvature of the seal 41. The glove insert 4 is provided for installation in the port flange 2.

The port flange 2 has all the electronic components 21,60,61,62,64,65 and 69, and the two cables 67,68 are connected, as already described for FIGS. 2B+4D. The passive safety sensor 66 is located on the shut-off part 5, and the RFID chip 46 is arranged in the fixing part 40 of the glove insert 4. To dock the glove insert 4 with the extension 58 extending from the mounted shut-off part 5, the retaining element 28 on the port flange 2 must be in the "open" position. It is assumed that the operator 9 already finds the "open" position on the retaining element 28 in this way or is authorized to trigger the switching pulse to the activator 69. The control unit 8 connected to the safety relay 81 is located externally on the containment 1.

FIGS. 7C and 7D

This pair of figures shows the advanced installation of the glove insert 4 according to FIGS. 5A+5B in the port flange 2, wherein furthermore the shut-off part 5 sits gas-tight on the fixing part 40 and the seal 41 is intact according to its concave curvature. To illustrate the possible range of variation in the design of the protective arrangement, the wireless version is shown here. Therefore, a transmitter/receiver 80 is again connected to the assembly of external control unit 8 and safety relay 81.

When, as the glove insert 4 is approached for installation in the port flange 2, a sufficient proximity between the RFID chip 46 accommodated in the fixing part 40 and the transmitting/receiving element 65 arranged in the port flange 2 is reached, the serial number of the glove insert 4 is read and compared with the database in the control unit 8, after which the operator 9 is shown on the display 61 a correct or incorrect assignment between port flange 2 and approached glove insert 4. If the assignment is incorrect, the locking between the extension 58 and the retaining element 28 is refused, which requires action by the operator 9, namely either the provision of a suitable glove insert 4 or—if possible—an overwriting of the entry in the database, in order to continue.

When the installation is completed per se, the operator 9 must enter his identification via the capture unit 62 in order to check his authorization for the installation. If the assignment is correct and authorization is granted for the operator 9, the activator 69 receives the switching command via the control unit 8 and the microcontroller 64 to switch the retaining element 28 to the "closed" position, whereby the extension 58 and retaining element 28 are locked together so that the shut-off part 5 comes into blocking position and cannot be removed without authorization. Access to the glove 3 lying in the vacuum and advancement into the work chamber 11 are blocked. Correct insertion of the glove insert 4 on the port flange 2 is confirmed via the display 61. In particular, the database of the control unit 8 records which glove insert 4 was installed on which port flange 2 by which operator 9 and when.

In the blocking position, the active safety sensor 21 detects the defined proximity of the passive safety sensor 66, picks up the signal and continuously transmits its signal wirelessly via the transmitting/receiving element 65 to the transmitter/receiver 80, but the latter, however, transmits the data in wired fashion to the safety relay 81. With the continuous signal flow, the safety relay 81 does not cause blocking of the equipment 13 in the work chamber 11, and the operating mode for the containment 1 and equipment 13 can be started. In a next step the work chamber 11 is decontaminated to treat the non-sterile outer face of the seal 41.

FIGS. 7E to 7G

This sequence of figures follows on from the previous pair of FIGS. 7C+7D with the wireless version in terms of the structure and operating principle of the arrangement. Here, the authorized removal of the shut-off part 5 from the glove insert 4 to produce the open position so that the operator 9 can intervene in the work chamber 11 through the access 24 using the work glove 3 pushed out of the glove insert 4 will now be discussed.

With reference to the explanations of FIGS. 2A-2D, there is no need to describe again the circuits on the device side or the signal-processing sequence, and therefore the following discussion is limited to the special features resulting from the use of the glove insert 4 according to FIGS. 5A+5B. Thus, it is assumed that the operator 9 has received the authorization to remove the shut-off part 5 from the glove insert 4, whereupon the holding element 28 already switched to the "open" position by the activator 69, i.e. the locking between the holding element 28 and the extension 58, is cancelled. At the latest with the onset of the removal of the shut-off part 5 from the fixing part 40, a signal interruption occurs between the passive safety sensor 66 and active safety sensor 21', which causes a blocking of the equipment 13 in the work chamber 11, as already described several times.

Once the shut-off part 5, which can be deposited at the parking station 15, for example by means of the magnetic zone 57, has been released, access to the work glove 3 is opened and the interior 42 is open towards the installation space 19. Thus, sterility is lost on the inner face 43 from the work glove 3, but not in the front space 45 with the adjacent surfaces. The intact seal 41, which is now planar due to the atmospheric pressure acting on it from the concave curvature, prevents contamination caused by overflowing gases or particles from penetrating from the work chamber 11 into the front space 45.

The operator 9 can now reach into the initially still compressed work glove 3 from the outside and can stretch it forward in the direction of the work chamber 11, thereby penetrating the seal 41, which is now sterile on both sides. It may be advantageous to open the seal 41 from the inside of the work chamber 11, for example with a robot belonging to the equipment 13. In each case after an intervention, it is advisable to place the work glove 3 in the shut-off part 5 which has not yet been locked again. After this, the shut-off part 5 is again placed on the fixing part 40 and locked by means of the retaining element 28 and extension 58, so that the shut-off part 5 is again in the blocking position and can only be removed again with the current authorization, in order to permit a next intervention in the work chamber 11 through the open seal 41 and the access 24 in the port flange 2 using the work glove 3. In particular, the database of the control unit 8 records by which glove insert 4, equipped with which work glove 3, at which port flange 2, by which operator 9, when and over which period of time, which shut-off part 5 has been moved between blocking position and open position.

FIG. 8

This arrangement consists of a combination with a shut-off part 5 integrated in the port flange 2 according to the first embodiment, as best shown in FIG. 2F, and a glove insert 4 installed in the port flange 2 with fitted cover 7 according to FIG. 6A. As a wireless version, the transmitter/receiver 80 is connected to the assembly of external control unit 8 and safety relay 81. The port flange 2 contains all electronic components 21',60,61,62,64,65 and 69. It is assumed here that the operator 9 received authorization to bring the shut-off part 5, designed as an iris diaphragm, into the open position, which led to a signal interruption between the passive safety sensor 66 and active safety sensor 21' and a blocking of the equipment 13 in the work chamber 11. In order to intervene in the work chamber 11 using the pre-sterilized work glove 3 still compressed in the glove insert 4, the cover 7, which is mounted gas-tightly on the fixing part 40, must first be removed and then the seal 41, which has previously been decontaminated on the outer face, must be penetrated with the advanced work glove 3 or opened in another way, for example from the inside of the work chamber 11, preferably with a robot belonging to the equipment 13.

FIG. 9

This arrangement consists of a combination with a hood-like shut-off part 5 fitted on the port flange 2 according to the second embodiment and a glove insert 4 inserted into the port flange 2 with a cover 7 fitted thereon according to FIG. 6A. The shut-off part 5 is in a blocking position, the first docking elements 25 of the port flange 2 are locked with the second docking elements 55 of the shut-off part 5. As a wired version with the two cables 67,68 leading to the port flange 2, the control unit 8 is directly connected to the safety relay 81; no connected transmitter/receiver 80 is required. The active safety sensor 21 is mounted in the port flange 2, while the other electronic components 60,61,62,64,65,66 and 69 are located in the shut-off part 5. In order to remove the shut-off part 5—to bring it into the open position—the operator 9 must first obtain authorization to do so, and then remove the cover 7, which is mounted gas-tightly on the fixing part 40. Finally, the paths are free for the operator 9 to penetrate through the seal 41 with the work glove 3 and to intervene in the work chamber 11 in order to carry out work there, for example, on the blocked equipment 13.

The invention claimed is:

1. An arrangement for protecting against unauthorized intervention in a containment through an access present in a port flange using a work glove, wherein:
   a) the port flange is installed in a front window or in a wall of a housing of the containment positioned in an installation space;
   b) the work glove is installed on the port flange and allows an operator to enter a work chamber of the containment in a protected manner;
   c) in the event that multiple port flanges are installed on the containment, there is one work glove fastened to each port flange;
   d) equipment for processing a material to be treated can be provided in the work chamber; and
   e) to temporarily block access, a shut-off part is provided, which can move into a blocking position and an open position, the shut-off part is integrated directly in the port flange and can be formed in a pivotable, stretchable, shutter-like or expandable manner, and in the configuration as a closure body integrated in the port flange, and the port flanges are each provided with a safety sensor, the two pairs of safety sensors are used, in cooperation with an external safety relay, to detect the position of the shut-off part in the port flange and, when the shut-off part is open, to activate an automatic blocking of the equipment, wherein
   f) to record personal data of the operator, a capture unit is provided, which has a connection to a microcontroller, in order to issue a switching command to an activator if there is correspondence between the captured personal data and the data in the microcontroller, whereby the shut-off part can be brought into the blocking position or can be moved therefrom into the open position and therefore the access is blocked or accessible, respectively;
   g) the activator is arranged directly on the port flange or on the shut-off part or on the front window; and
   h) the data of the microcontroller are stored directly therein or originate from an external control unit.

2. The arrangement as claimed in claim 1, wherein the two safety sensors capture the position of the shut-off part in relation to the port flange and, when the shut-off part is distanced from the port flange, activate an automatic blocking of the equipment.

3. The arrangement as claimed in claim 1, wherein:
   a) the control unit and the safety relay cooperating therewith per port flange is in each case assigned a transmitter/receiver; and
   b) the active safety sensor in the port flange or in the shut-off part serves to identify whether the complementary passive safety sensor is present, wherein a transmitting/receiving element wirelessly signals an absence of the passive safety sensor to the transmitter/receiver, whereupon the transmitter/receiver communicates the absence of the passive safety sensor to the safety relay and automatically blocks the equipment.

4. The arrangement as claimed in claim 3, wherein:
   a) each work glove has an RFID chip, which has stored thereon an individual serial number and preferably additionally its production data, which can be read by means of the transmitting/receiving element and are stored in the control unit and/or in the microcontroller;
   b) each new action at the port flange and at the work glove is captured by means of the control unit and is stored therein for the relevant work glove, that is to say is added to the individual maintenance data.

5. The arrangement as claimed in claim 4, wherein:
a) the production data of each work glove can comprise:
   aa) the individual serial number;
   ab) the production date;
   ac) the glove size;
   ad) the material type;
   ae) the used sterilization method;
   af) the maximum use date; and
b) the maintenance data of each work glove can comprise:
   ba) the date of installation in a port flange;
   bb) the personal data of the installer;
   bc) the identifier of the port flange on which the installation was performed;
   bd) when, how often and by which operator the shut-off part at the relevant work glove was brought into the blocking position or moved therefrom into the open position;
   be) the time and count of the number of decontamination cycles at the work chamber of the containment and the maximum permissible number of decontamination cycles;
   bf) the time and number of the leak tests performed on the relevant work glove;
   bg) the batches and products which are handled in the work chamber of the containment and for which the relevant work glove is used;
   bh) special instructions to be input manually by the operator; and
   bi) the personal data of the installer performing the disassembly and disposal of the relevant work glove.

6. The arrangement as claimed in claim 1, wherein the port flange is provided with:
a) the capture unit;
b) a microcontroller; and
c) the activator, which is actuatable manually or in driven fashion and serves to move the shut-off part into the blocking or open position; and optionally with:
d) a display and a battery.

7. The arrangement as claimed in claim 1, wherein:
a) the capture unit is intended for recording biometric identifiers of the operator, a code to be input by the operator, or the electronic data of a data carrier to be presented by the operator; and
b) the identifier recorded by the capture unit from the operator, in cooperation with the microcontroller, grants or otherwise denies the operator who becomes active authorization to move the shut-off part into the blocking or open position at the relevant port flange by switching the activator, depending on the data stored in the microcontroller or data received via the control unit.

8. The arrangement as claimed in claim 1, wherein:
a) the capture unit for recording personal data of the operator is assigned to the corresponding port flange or the corresponding shut-off part; and
b) if there is correspondence between the captured personal data and the data in the microcontroller, the activator receives the switching command in order to allow the operator to fit this specific shut-off part to this specific port flange and to bring it into the blocking position or to unlock it and to remove it from this specific port flange, whereby the access is blocked or accessible.

9. The arrangement as claimed in claim 8, wherein the capture unit for recording personal data of the operator is provided:
a) in the corresponding port flange; or
b) in the corresponding shut-off part; or
c) for all relevant port flanges and shut-off parts of the containment in a mobile device.

10. The arrangement as claimed in claim 1, wherein the shut-off part is integrated directly in the port flange and can be formed in a pivotable, stretchable, shutter-like or expandable manner.

11. The arrangement as claimed in claim 10, wherein:
a) the shut-off part, in the configuration as a closure body integrated in the port flange, and the port flange are each provided with a safety sensor; and
b) the two pairs of safety sensors are used, in cooperation with an external safety relay, to detect the position of the shut-off part in the port flange and, when the shut-off part is open, to activate an automatic blocking of the equipment.

12. The arrangement as claimed in claim 10, wherein:
a) the shut-off part, in the configuration as a closure body which is releasably connected to the glove insert and which can be locked on and removed from the port flange, and the port flange are each provided with a safety sensor; and
b) the two pairs of safety sensors serve, in cooperation with an external safety relay, to capture the position of the shut-off part in relation to the port flange and, when the shut-off part is distanced from the port flange, to activate an automatic blocking of the equipment.

13. The arrangement according to claim 1, wherein the shut-off part, in the configuration as a separate closure body which can be docked on or removed from the port flange, or the port flange are provided with:
a) the capture unit;
b) the microcontroller; and
c) the activator, which is actuatable manually or in driven fashion and serves to move the shut-off part into the blocking or open position; and optionally with:
d) a display and a battery.

14. The arrangement as claimed in claim 1, wherein:
a) the port flange has an RFID chip; and
b) the shut-off part, in the configuration as a separate closure body which can be docked on or removed from the port flange, is provided with a transmitting/receiving element; wherein
c) the transmitting/receiving element is used, when placing the shut-off part on the port flange, to detect this pairing and to permit or refuse the locking of the shut-off part according to the data stored in the control unit or in the microcontroller.

15. The arrangement as claimed in claim 14, wherein, when the shut-off part is mounted on the glove insert and in the state in which the seal is intact, a negative pressure prevails in the internal volume of the glove insert between the seal and the surface, and the internal volume with the face of the seal facing said internal volume and also the surface are sterile.

16. The arrangement as claimed in claim 14, wherein:
a) the free end of the glove is fastened to the fixing part and/or to the seal in the vicinity of the fixing part, wherein the seal at least substantially spans the clear width of the fixing part; and
b) when the shut-off part is mounted on the glove insert or when the cover is mounted and in the state in which the seal is intact, the seal is visually noticeably curved concavely relative to the glove insert as a result of the negative pressure prevailing therein.

17. The arrangement as claimed in claim 1, wherein the work glove is supplemented to form a module that can be inserted gas-tight into the port flange in the form of a glove insert, and consists of a seal that is removable or is to be opened and is arranged on one side, a half-shell-like shut-off part that can be released from the module on the other side and the work glove packed in vacuumed fashion between the two.

18. The arrangement as claimed in claim 1, wherein the glove insert provided in the form of a module also has:
   a) an annular or oval fixing part, which is used for fastening to the port flange;
   b) an extension which is intended for cooperation with a switchable holding element, which extends from the port flange, in order to temporarily secure the shut-off part; and
   c) an RFID chip arranged in the fixing part of the glove insert.

19. The arrangement as claimed in claim 1, wherein the work glove is supplemented to form a module that can be inserted gas-tight into the port flange, in the form of a glove insert, and consists of a seal that is removable or is to be opened and is arranged on one side, of a cover that can be released from the module on the other side and the work glove packed in vacuumed fashion between the two.

20. The arrangement as claimed in claim 19, wherein, when a cover is mounted on the glove insert and in the state in which the seal is intact, a negative pressure prevails between the seal and the surface, and the internal volume with the face of the seal facing said internal volume and also the surface are sterile.

21. The arrangement as claimed in claim 19, wherein the glove insert provided in the form of a module also has:
   a) a fixing part which is used for fastening to the port flange;
   b) an RFID chip arranged in the fixing part of the glove insert; and
   c) optionally a magnetic zone on the cover, which magnetic zone is intended to cooperate with the fixing part in order to temporarily additionally secure the cover.

22. An arrangement for protecting against unauthorized intervention in a containment through an access present in a port flange using a work glove, wherein:
   a) the port flange is installed in a front window or in a wall of a housing of the containment positioned in an installation space;
   b) the work glove is installed on the port flange and allows an operator to enter a work chamber of the containment in a protected manner;
   c) in the event that multiple port flanges are installed on the containment, there is one work glove fastened to each port flange, the shut-off part is integrated directly in the port flange and can be formed in a pivotable, stretchable, shutter-like or expandable manner, the port flanges each provided with a safety sensor, the two safety sensors used, in cooperation with an external safety relay, to capture the position of the shut-off part in relation to the port flange and, when the shut-off part is distanced from the port flange, to activate an automatic blocking of the equipment;
   d) equipment for processing a material to be treated can be provided in the work chamber; and
   e) to temporarily block access, a shut-off part is provided, which can move into a blocking position and an open position, wherein
   f) to record personal data of the operator, a capture unit is provided, which has a connection to a microcontroller, in order to issue a switching command to an activator if there is correspondence between the captured personal data and the data in the microcontroller, whereby the shut-off part can be brought into the blocking position or can be moved therefrom into the open position and therefore the access is blocked or accessible, respectively;
   g) the activator is arranged directly on the port flange or on the shut-off part or on the front window; and
   h) the data of the microcontroller are stored directly therein or originate from an external control unit.

23. The arrangement as claimed in claim 22, wherein the two pairs of safety sensors are used, in cooperation with an external safety relay, to detect the position of the shut-off part in the port flange and, when the shut-off part is open, to activate an automatic blocking of the equipment.

24. The arrangement as claimed in claim 23, wherein:
   a) the control unit and the safety relay cooperating therewith per port flange is in each case assigned a transmitter/receiver; and
   b) the active safety sensor in the port flange or in the shut-off part serves to identify whether the complementary passive safety sensor is present, wherein a transmitting/receiving element wirelessly signals an absence of the passive safety sensor to the transmitter/receiver, whereupon the transmitter/receiver communicates the absence of the passive safety sensor to the safety relay and automatically blocks the equipment.

25. The arrangement as claimed in claim 24, wherein:
   a) each work glove has an RFID chip, which has stored thereon an individual serial number and preferably additionally its production data, which can be read by means of the transmitting/receiving element and are stored in the control unit and/or in the microcontroller;
   b) each new action at the port flange and at the work glove is captured by means of the control unit and is stored therein for the relevant work glove, that is to say is added to the individual maintenance data.

26. The arrangement as claimed in claim 25, wherein:
   a) the production data of each work glove can comprise:
      aa) the individual serial number;
      ab) the production date;
      ac) the glove size;
      ad) the material type;
      ae) the used sterilization method;
      af) the maximum use date; and
   b) the maintenance data of each work glove can comprise:
      ba) the date of installation in a port flange;
      bb) the personal data of the installer;
      bc) the identifier of the port flange on which the installation was performed;
      bd) when, how often and by which operator the shut-off part at the relevant work glove was brought into the blocking position or moved therefrom into the open position;
      be) the time and count of the number of decontamination cycles at the work chamber of the containment and the maximum permissible number of decontamination cycles;
      bf) the time and number of the leak tests performed on the relevant work glove;
      bg the batches and products which are handled in the work chamber of the containment and for which the relevant work glove is used;
      bh) special instructions to be input manually by the operator; and
      bi) the personal data of the installer performing the disassembly and disposal of the relevant work glove.

27. The arrangement as claimed in claim 23, wherein the port flange is provided with:
   a) the capture unit;
   b) a microcontroller; and
   c) the activator, which is actuatable manually or in driven fashion and serves to move the shut-off part into the blocking or open position; and optionally with:
   d) a display and a battery.

28. The arrangement as claimed in claim 22, wherein:
   a) the capture unit is intended for recording biometric identifiers of the operator, a code to be input by the operator, or the electronic data of a data carrier to be presented by the operator; and
   b) the identifier recorded by the capture unit from the operator, in cooperation with the microcontroller, grants or otherwise denies the operator who becomes active authorization to move the shut-off part into the blocking or open position at the relevant port flange by switching the activator, depending on the data stored in the microcontroller or data received via the control unit.

\* \* \* \* \*